United States Patent
Tao et al.

(10) Patent No.: US 11,221,211 B2
(45) Date of Patent: Jan. 11, 2022

(54) SYSTEMS AND METHODS FOR NON-DESTRUCTIVE EVALUATION OF OPTICAL MATERIAL PROPERTIES AND SURFACES

(71) Applicant: Vanderbilt University, Nashville, TN (US)

(72) Inventors: Yuankai Tao, Nashville, TN (US); Mohamed T. El-Haddad, Nashville, TN (US)

(73) Assignee: Vanderbilt University, Nashville, TN (US)

(*) Notice: Subject to any disclaimer, the term of this patent is extended or adjusted under 35 U.S.C. 154(b) by 0 days.

(21) Appl. No.: 16/964,709

(22) PCT Filed: Jan. 25, 2019

(86) PCT No.: PCT/US2019/015148
§ 371 (c)(1),
(2) Date: Jul. 24, 2020

(87) PCT Pub. No.: WO2019/147936
PCT Pub. Date: Aug. 1, 2019

(65) Prior Publication Data
US 2021/0088327 A1    Mar. 25, 2021

Related U.S. Application Data

(60) Provisional application No. 62/622,577, filed on Jan. 26, 2018.

(51) Int. Cl.
*G01B 11/255* (2006.01)
*G01B 9/02* (2006.01)
*G01M 11/02* (2006.01)

(52) U.S. Cl.
CPC ........ *G01B 11/255* (2013.01); *G01B 9/02091* (2013.01); *G01M 11/025* (2013.01); *G01M 11/0271* (2013.01)

(58) Field of Classification Search
CPC ............ G01B 11/255; G01M 11/0221; G01M 11/025; G01M 11/0235; G01M 11/0271
(Continued)

(56) References Cited

U.S. PATENT DOCUMENTS 5,298,939 A    3/1994    Swanson et al.
5,867,305 A    2/1999    Waarts et al.
(Continued)

OTHER PUBLICATIONS

Aguilar et al., "On the Limitations of the Confocal Scanning Optical Microscope as a Profilometer", Journal of Modern Optics: vol. 42, No. 9, pp. 1785-1794, 1995.
(Continued)

*Primary Examiner* — Michael A Lyons
(74) *Attorney, Agent, or Firm* — Michael Best & Friedrich LLP

(57) ABSTRACT

System and methods are provided for characterizing an internal surface of a lens using interferometry measurements. Sphere-fitting a distorted radius determines distorted pathlengths. Ray-tracing simulates refraction at all upstream surfaces to determine a cumulative path length. A residual pathlength is scaled by the group-index and rays are propagated based on the phase-index. After aspheric surface fitting, a corrected radius is determined. To estimate a glass type for the lens, a thickness between focal planes of the lens surfaces is determined using RCM measurements. Then, for both surfaces, the surface is positioned into focus, interferometer path length matching is performed, a reference arm is translated to stationary phase point positions for three wavelengths to determine three per-color optical thicknesses, and ray-tracing is performed. A glass type is iden- (Continued)

tified by minimizing an error function based on optical parameters of the lens and parameters determined from known glass types from a database.

13 Claims, 22 Drawing Sheets

(58) Field of Classification Search
USPC .......................................................... 356/515
See application file for complete search history.

(56) References Cited

U.S. PATENT DOCUMENTS

| | | | |
|---|---|---|---|
| 6,008,904 | A | 12/1999 | Ishii et al. |
| 6,211,988 | B1 | 4/2001 | Engelhardt et al. |
| 6,501,603 | B2 | 12/2002 | Kasahara |
| 7,400,804 | B1 | 7/2008 | Di Teodoro et al. |
| 7,436,585 | B1 | 10/2008 | Di Teodoro et al. |
| 7,605,926 | B1* | 10/2009 | Hetzler .............. G01M 11/0221 356/515 |
| 7,751,118 | B1 | 7/2010 | Di Teodoro et al. |
| 8,848,199 | B2 | 9/2014 | Choi et al. |
| 9,207,408 | B1 | 12/2015 | Di Teodoro et al. |
| 9,564,730 | B2 | 2/2017 | Savage-Leuchs |
| 9,871,948 | B2 | 1/2018 | Papadopoulos et al. |
| 9,877,654 | B2 | 1/2018 | Tesar |
| 10,649,136 | B2 | 5/2020 | Weirich et al. |
| 2002/0126293 | A1* | 9/2002 | Deck .................. G01B 11/2441 356/496 |
| 2003/0011784 | A1 | 1/2003 | De Groot et al. |
| 2003/0160968 | A1 | 8/2003 | Deck |
| 2004/0005127 | A1 | 1/2004 | Kilner et al. |
| 2004/0052459 | A1 | 3/2004 | Battiato et al. |
| 2004/0065118 | A1 | 4/2004 | Kilner et al. |
| 2005/0128468 | A1* | 6/2005 | Murata .............. G01M 11/0221 356/127 |
| 2005/0225774 | A1 | 10/2005 | Freimann et al. |
| 2006/0221350 | A1* | 10/2006 | Murphy .............. G01B 9/02057 356/614 |
| 2007/0024858 | A1 | 2/2007 | Takahashi |
| 2007/0126849 | A1 | 6/2007 | Maeda |
| 2008/0316500 | A1* | 12/2008 | Schulte .............. G01B 9/02057 356/521 |
| 2011/0075976 | A1 | 3/2011 | Sutherland |
| 2011/0176191 | A1 | 7/2011 | Matsuoka |
| 2011/0249311 | A1 | 10/2011 | Engelhardt |
| 2012/0092461 | A1 | 4/2012 | Fisker et al. |
| 2012/0281223 | A1 | 11/2012 | Mortimer et al. |
| 2013/0010286 | A1* | 1/2013 | Zhao .................. G01M 11/025 356/73 |
| 2013/0331709 | A1 | 12/2013 | Le et al. |
| 2015/0015879 | A1 | 1/2015 | Papadopoulos et al. |
| 2015/0305618 | A1 | 10/2015 | Buckland et al. |
| 2016/0218477 | A1 | 7/2016 | Savage-Leuchs |
| 2017/0027437 | A1 | 2/2017 | Neal et al. |
| 2018/0188447 | A1 | 7/2018 | Weirich et al. |
| 2019/0384006 | A1 | 12/2019 | Tao et al. |
| 2020/0233207 | A1 | 7/2020 | Tao et al. |
| 2020/0341190 | A1 | 10/2020 | Weirich et al. |

OTHER PUBLICATIONS

Betzig et al., "Imaging Intracellular Fluorescent Proteins at Nanometer Resolution", Science 313, pp. 1642-1645, 2006.
Booth, "Adaptive optics in microscopy", Philos. Trans. R. Soc. Lond. Math. Phys. Eng. Sci. 365, 2829-2843, 2007.
Bourgenot et al., "3D adaptive optics in a light sheet microscope" Opt. Express 20, pp. 13252-13261, 2012.
Brouwer, "Matrix Methods in Optical Instrument Design" (1964).
Chen et al., "Lattice light-sheet microscopy: Imaging molecules to embryos at high spatiotemporal resolution" Science 346, 1257998, 2014.
Cheng et al., "Coherent Anti-Stokes Raman Scattering Microscopy: Instrumentation, Theory, and Applications", J. Phys. Chem. B 108, p. 827-840, 2004.
Chlebus et al., "Direct measurement of group dispersion of optical components using white-light spectral interferometry", Opto Electron. Rev. 15, pp. 144-148, 2007.
Choi et al., "Phase sensitive swept-source optical coherence tomography imaging of the human retina with a vertical cavity surface-emitting laser light source", Optical Letters, vol. 38, No. 3, Feb. 2013, pp. 338-340.
Denk et al., "Two-photon laser scanning fluorescence microscopy" Science 248, pp. 73-76, 1990.
Dhalla et al., "Complex conjugate resolved heterodyne swept source opitcal coherence tomography using coherence revival", Biomedical Optics Express, vol. 3, No. 3, Feb. 2012, 17 pages.
Diddams et al., "Dispersion measurements with white-light interferometry" JOSA B 13, pp. 1120-1129, 1996.
Dufour et al., "Low-coherence interferometry—An advanced technique for optical metrology in industry" Insight—Non Destructive Testing and Condition Monitoring, Apr. 2005, 8 pages.
Francis et al., "Spectrometer-based refractive index and dispersion measurement using low-coherence interferometry with confocal scanning" Opt. Express 26, pp. 3604-3617, 2018.
Freund et al., "Connective tissue polarity. Optical second-harmonic microscopy, crossed-beam summation, and small-angle scattering in rat-tail tendon", Biophys. J. 50, pp. 693-712, 1986.
Fukano et al., "Separation of measurement of the refractive index and the geometrical thickness by use of a wavelength-scanning interferometer with a confocal microscope", Appl. Opt. 38, pp. 4065-4073, 1999.
Fukano et al., "Simultaneous measurement of thicknesses and refractive indices of multiple layers by a low-coherence confocal interference microscope", Opt. Lett. 21, pp. 1942-1944, 1996.
Galli et al., "Direct measurement of refractive-index dispersion of transparent media by whitelight interferometry", Appl. Opt. 42, pp. 3910-3914, 2003.
Gerrard et al., "Introduction to Matrix Methods in Optics" (Courier Corporation, 1994).
Gustafsson, "Surpassing the lateral resolution limit by a factor of two using structured illumination microscopy", J. Microsc. 198, pp. 82-87, 2000.
Haruna et al., "Simultaneous measurement of the phase and group indices and the thickness of transparent plates by low-coherence interferometry" Opt. Lett. 23, pp. 966-968, 1998.
Hein et al., "Stimulated emission depletion (STED) nanoscopy of a fluorescent protein-labeled organelle inside a living cell", Proc. Natl. Acad. Sci. 105, pp. 14271-14276, 2008.
Hell et al., "Breaking the diffraction resolution limit by stimulated emission: stimulated-emission-depletion fluorescence microscopy", Opt. Lett. 19, pp. 780-782, 1994.
Huang et al., "Optical coherence tomography", Science, vol. 254, Nov. 1991, pp. pp. 1178-1181.
Huisken et al. "Optical Sectioning Deep Inside Live Embryos by Selective Plane Illumination Microscopy" Science 305, pp. 1007-1009, 2004.
International Search Report and Written Opinion for related Application No. PCT/US2018/015531 dated May 25, 2018 (11 pages).
International Search Report and Written Opinion for related Application No. PCT/US2019/015148 dated May 24, 2019 (17 pages).
Ji et al., "Characterization and adaptive optical correction of aberrations during in vivo imaging in the mouse cortex", Proc. Natl. Acad. Sci. 109, pp. 22-27, 2012.
Kumar et al., "Using interference in the frequency domain for precise determination of thickness and refractive indices of normal dispersive materials", JOSA B 12, pp. 1559-1563, 1995.
Kurvits et al., "Comparative analysis of imaging configurations and objectives for Fourier microscopy" J. Opt. Soc. Am. A 32, 2082, 2015.
Lin et al., "6×6 matrix formalism of optical elements for modeling and analyzing 3D optical systems", Appl. Phys. B 97, pp. 135-143, 2009.

(56) References Cited

OTHER PUBLICATIONS

Liu et al., "All-fiber, high power single-frequency linearly polarized ytterbium-doped fiber amplifier" Chinese Optics Letters, vol. 9, No 3., Mar. 10, 2011; figure 1; p. 031402-1, paragraph 5-p. 031402-1, paragraph 3.

Malacara-Doblado, D. & Ghozeil, I. Hartmann, Hartmann-Shack, and Other Screen Tests, in Optical Shop Testing (ed. Daniellacara) pp. 361-397, 2007.

Martinez-Enriquez et al., "OCT-based full crystalline lens shape change during accommodation in vivo", Biomed. Opt. Express 8, pp. 918-933, 2017.

Maruyama et al., "Low-coherence interferometer system for the simultaneous measurement of refractive index and thickness" Appl. Opt. 41, pp. 1315-1322, 2002.

Na et al., "Self-referenced spectral interferometry for simultaneous measurements of thickness and refractive index", Appl. Opt. 48, pp. 2461-2467, 2009.

Olivier et al., "Dynamic aberration correction for multiharmonic microscopy" Opt. Lett. 34, pp. 3145-3147, 2009.

Ortiz et al. "Optical coherence tomography for quantitative surface topography" Appl. Opt. 48, pp. 6708-6715 (2009).

Ortiz et al., "Optical distortion correction in Optical Coherence Tomography for quantitative ocular anterior segment by three-dimensional imaging" Opt. Express 18, pp. 2782-2796 (2010).

Piratelli-Filho et al., "Error evaluation in reverse engineering of aspherical lenses" 17th International Congress of Metrology, 13007, EDP Sciences, 2015.

Poddar et al., "In vivo imaging of human vasculature in the chorioretinal complex using phase-variance contrast method with phase-stabilized 1-μm swept-source optical coherence tomography", Journal of Biomedical Optics, vol. 19., No. 12, Dec. 2014, p. 126010-1-126010-12.

Royer et al., "A practical guide to adaptive light-sheet microscopy", Nat. Protoc. 13, 2462 (2018).

Rust et al., "Sub-diffraction-limit imaging by stochastic optical reconstruction microscopy (STORM)", Nat. Methods 3, pp. 793-796, 2006.

Sáinz et al., "Real time interferometric measurements of dispersion curves" Opt. Commun. 111, pp. 632-641, 1994.

Silvestri et al., "Correcting spherical aberrations in confocal light sheet microscopy: A theoretical study", Microsc. Res. Tech. 77, pp. 483-491 (2014).

Sinefeld et al., "Adaptive optics in multiphoton microscopy: comparison of two, three and four photon fluorescence" Opt. Express 23, pp. 31472-31483, 2015.

Stirman et al., "Wide field-of-view, multi-region, two-photon imaging of neuronal activity in the mammalian brain" Nat. Biotechnol. 34, pp. 857-862, 2016.

Tearney et al., "Determination of the refractive index of highly scattering human tissue by optical coherence tomography", Opt. Lett. 20, pp. 2258-2260, 1995.

Tomlins et al., "Simultaneous analysis of refractive index and physical thickness by Fourier domain optical coherence tomography" IEE Proc.—Optoelectron. 153, pp. 222-228, 2006.

Uhlhorn et al., "Refractive Index Measurement of the Isolated Crystalline Lens Using Optical Coherence Tomography," Vision Res. 48, pp. 2732-2738, 2008.

Wang et al., "Depth-encoded all-fiber swept source polarization sensitive OCT", Biomedical Optics Express, vol. 5, No. 9, Aug. 2014, 19 pages.

Wojtkowski et al., "Ultrahigh-resolution, high-speed, Fourier domain optical coherence tomography and methods for dispersion compensation" Opt. Express 12, pp. 2404-2422, 2004.

Wu et al., "Faster, sharper, and deeper: structured illumination microscopy for biological imaging", Nat. Methods 1, 2018.

Xu et al., "Multiphoton fluorescence excitation: new spectral windows for biological nonlinear microscopy", Proc. Natl. Acad. Sci. 93, pp. 10763-10768, 1996.

Youngquist et al., "Optical coherence-domain reflectometry: a new optical evaluation technique" Opt. Lett. 12, pp. 158-160, 1987.

Zinter et al., "Maximizing fluorescence collection efficiency in multiphoton microscopy" Opt. Express 19, pp. 15348-15362, 2011.

Zipfel et al., "Nonlinear magic: multiphoton microscopy in the biosciences" Nat. Biotechnol. 21, pp. 1369-1377, 2003.

Abrams et al., "Speed and accuracy of saccadic eye movements: characteristics of impulse variability in the oculomotor system", J. Exp Psychol Hum Percept Perform, vol. 15, No. 3, 1989, pp. 529-543.

Braaf et al., "Real-time eye motion correction in phase resolved OCT angiography with tracking SLO", Biomedical Optics Express, vol. 4, No. 1, 2012, pp. 51-65.

Cabrera et al., "Exudative retinal detachment documented by hand-held spectral domain optical coherence tomography after retinal laser photocoagulation for retinopathy of prematurity", Retina Cases Brief Res, 1, 2018.

Campbell et al., "Handheld optical coherence tomography angiography and ultra-wide-field optical coherence tomography in retinopathy of prematurity", JAMA Ophthalmology, vol. 135, No. 9, 2017, pp. 977-981.

Chavala et al., "Insights into advanced retinopathy of prematurity using handheld spectral domain optical coherence tomography imaging", Ophthalmology, vol. 116, No. 12, 2009, pp. 2448-2456.

Chen et al., "Eye-motion-corrected optical coherence tomography angiography using Lissajous scanning", Biomedical Optics Express, vol. 9, No. 3, 2018, pp. 1111-1129.

Chen et al., "Three-dimensional eye motion correction by Lissajous scan optical coherence tomography", Biomedical Optics Express, vol. 8, No. 3, 2017, pp. 1783-1802.

Choi et al., "Ultrahigh-speed, swept-source optical coherence tomography angiography in nonexudative age-related macular degeneration with geography atrophy", Ophthalmology, vol. 122, No. 12, 2015, pp. 2532-2544.

Choma et al., "Sensitivity advantage of swept source and Fourier doman opitcal coherence tomography", Optics Express, vol. 11, No. 18, 2003, pp. 2183-2189.

Demene et al., "Spatiotemporal clutter filtering of ultrafast ultrasound date highly increases Doppler and ultrasound sensitivity", IEEE Transactoins on Medical Imaging, vol. 34, No. 11, 2015, pp. 2271-2285.

DuBose et al., "Handheld adaptive optics scanning laser ophthalmoscope", Optica, vol. 5, No. 9, 2018, pp. 1027-1036.

Elble, "Central Mechanisms of tremor", J. Clin. Neurophysiol, vol. 13, No. 2, 1996, pp. 133-144.

El-Haddad et al., "Spectrally encoded coherence tomography and reflectometry: simultaneous en face and cross-sectional imaging at 2 gigapixels per second", J. Biophotonics, vol. 11, No. 4, 2018, p. e201700268.

Frangi et al., "Multiscale Vessel Enhancement Filtering", Springer, 1998, pp. 130-137.

Gerth et al., "High-resolution retinal imaging in young children using a handheld scanner and Fourier-domain optical coherence tomogrpahy", J. Am. Assoc. Pediatrics Ophthalmology Strabismus, vol. 13, No. 1, 2009, pp. 72-74.

Guizar-Sicairos et al., "Efficient subpixel image registration algorithms", Opt Lett, vol. 33, No. 2, 2008, pp. 156-158.

Helb et al., "Clinical evaluation of simultaneous confocal scanning laser ophthalmoscopy imaging combined with high-resolution, spectral-domain optical coherence tomogrpahy", Acta Ophthalmology, vol. 88, No. 8, 2010, pp. 842-849.

Huber et al., "Fourier domain mode locking at 1050 nm for ultra-high-speed optical coherence tomography of the human retina at 236,000 axial scans per second", Opt. letter, vol. 32, No. 14, 2007, pp. 2049-2051.

Huo et al., "Ultrahigh-speed optical coherence tomography utilizing all-optical 40 MHz swept-source", J Biomed Opt, vol. 20, No. 3, 2015, p. 030503.

Joshi et al., "Optical coherence tomography findings in stage 4A retinopathy of prematurity", Ophthalmology, vol. 113, No. 4, 2006, pp. 657-660.

Jung et al., "Handheld optical coherence tomography scanner for primary care diagnostics", IEEE Transactions on Biomedical Engineering, vol. 58, No. 3, 2011, pp. 741-744.

(56) References Cited

OTHER PUBLICATIONS

Klein et al., "High-speed OCT light sources and systems [Invited]", Biomedical Optics Express, vol. 8, No. 2, 2017, pp. 828-859.

Kraus et al., "Motion correction in opitcal coherence tomography vols. on a per A-scan basis using orthogonal scan patterns", Biomedical Optics Express, vol. 3, No. 6, 2012, pp. 1182-1199.

LaRocca et al., "Handheld simultaneous scanning laser ophthalmoscopy and optical coherence tomography system", Biomedical Optics Express, vol. 4, No. 11, 2013, pp. 2307-2312.

Laurutis et al., "The vestibulo-ocular reflex during human saccadic eye movements", J. Physiol., vol. 373, 1986, pp. 209-233.

Le et al., "Robust principal component analysis in optical microangiography", Quant Imaging Med Surg, vol. 7, No. 6, 2017, pp. 654-667.

Lee et al., "Macular features from spectral-domain optical coherence tomography as an adjunct to indirect ophthalmoscopy in retinopathy of prematurity", Retina, vol. 31, No. 8, 2011, pp. 1470-1482.

Lu et al., "Handheld ultrahigh speed swept source optical coherence tomography instrument using a MEMS scanning mirror", Biomedical Optics Express, vol. 5, No. 1, 2014, pp. 293-311.

Mallipatna et al., "The use of handheld spectral domain optical coherence tomography in pediatric ophthalmology practice: our experience of 975 infants and children", Indian J. Ophthalmol, vol. 63, No. 7, 2015, pp. 586-593.

Malone et al., "Simultaneous multimodal ophthalmic imaging using swept-source spectrlaly encoded scanning laser ophthalmoscopy and optical coherence tomography", Biomedical Optics Express, vol. 8, No. 1, 2017, pp. 193-206.

Martinez-Conde et al., "The role of fixational eye movements in visual perception", Nat. Rev Neuroscie, vol. 5, No. 3, 2004, pp. 229-240.

Moult et al., "Ultrahigh-speed swept-source OCT angiography in exudative AMD", Ophthalmic Surgery Lasers Imaging Retina, vol. 45, No. 6, 2014, pp. 496-505.

Nankivil et al., "Handheld, rapidly switchable, anterior/posterior segment swept source opitcla coherence tomography probe", Biomedical Optics Express, vol. 6, No. 11, 2015, pp. 4516-4528.

Ng et al., "Fundus fluorescein angiography in the screening for and management of retinopathy of prematurity", J Pediatr. Ophthalmol Strabismus, vol. 43, No. 2, 2006, pp. 85-90.

Patel, "Optical coherence tomography in the management of acute retinopathy of prematurity", Am J. Ophthalmol, vol. 141, No. 3, 2006, pp. 582-584.

Pircher et al., "Simultaneous SLO/OCT imaging of the human retina with axial eye motion correction", Optics Express, vol. 15, No. 25, 2007, pp. 16922-16923.

Polans et al., "Asymmetric wide-field optical model of the human eye with tilted and decentered crystalline lens that reproduces experimentally measured abberations: errata", Optica, vol. 5, No. 11, 2018, pp. 1461.

Polans et al., "Wide-field optical model of the human eye with asymmetrically tilted and decentered lens that reproduces measured ocular aberrations", Optica, vol. 2, No. 2, 2015, pp. 124-134.

Satue et al., "Use of Fourier-domain OCT to detect retinal nerve fiber layer degeneration in Parkinson's disease patients", Eye, vol. 27, No. 4, 2013, pp. 507-514.

Sheehy et al., "High-speed, image-based eye tracking with a scanning laser ophthalmoscope", Biomedical Optics Express, vol. 3, No. 10, 2012, pp. 2611-2622.

Song et al., "Development of a clinical prototype of a miniature hand-held optical coherence tomography probe for prematurity and pediatric ophthalmic imaging", Biomedical Optics Express, vol. 10, No. 5, 2019, pp. 2383-2398.

Tao et al, "Interlaced spectrally encoded confocal scanning laser ophthalmoscopy and spectral domain optical coherence tomography", Biomedical Optics Express, vol. 1, No 2, 2010, pp. 431-440.

Tong et al., "Evaluation of optic nerve development in preterm and term infants using handheld spectral-domain optical coherence tomography", Ophthalmology, vol. 121, No. 9, 2014, pp. 1818-1826.

Viehland et al., "Ergonomic handheld OCT angiography probe optimized for pediatric and supine imaging", Biomedical Optics Express, vol. 10, No. 5, 2019, pp. 2623-2638.

Vinekar et al., "Understanding clinically undetected macular changes in early retinopathy of prematurity on spectral domain optical coherence tomography", Invest Opthalmol Vis Sci, vol. 52, No. 8, 2011, pp. 5183-8188.

Zang et al., "Automated motion correcting using parallel-strip registration for wide-field en face OCT angiogram", Biomedical Optics Express, vol. 7, No. 7, 2016, pp. 2823-2836.

Zhang et al., "In vivo wide-field multispectral scanning laser ophthalmoscopy-optical coherence tomography mouse retinal imager: longitudinal imaging of ganglion cells, microglia, and Muller glia, and mapping of the mouse retinal and choroidal vasculature", Journal of Biomed Opt, vol. 20, No. 12, 2015, pp. 126005.

Zhang et al., "Methods and algorithms for optical coherence tomography-based angiography: a review and comparison", J. Biomed Opt, vol. 20, No. 10, 2015, pp. 100901.

* cited by examiner

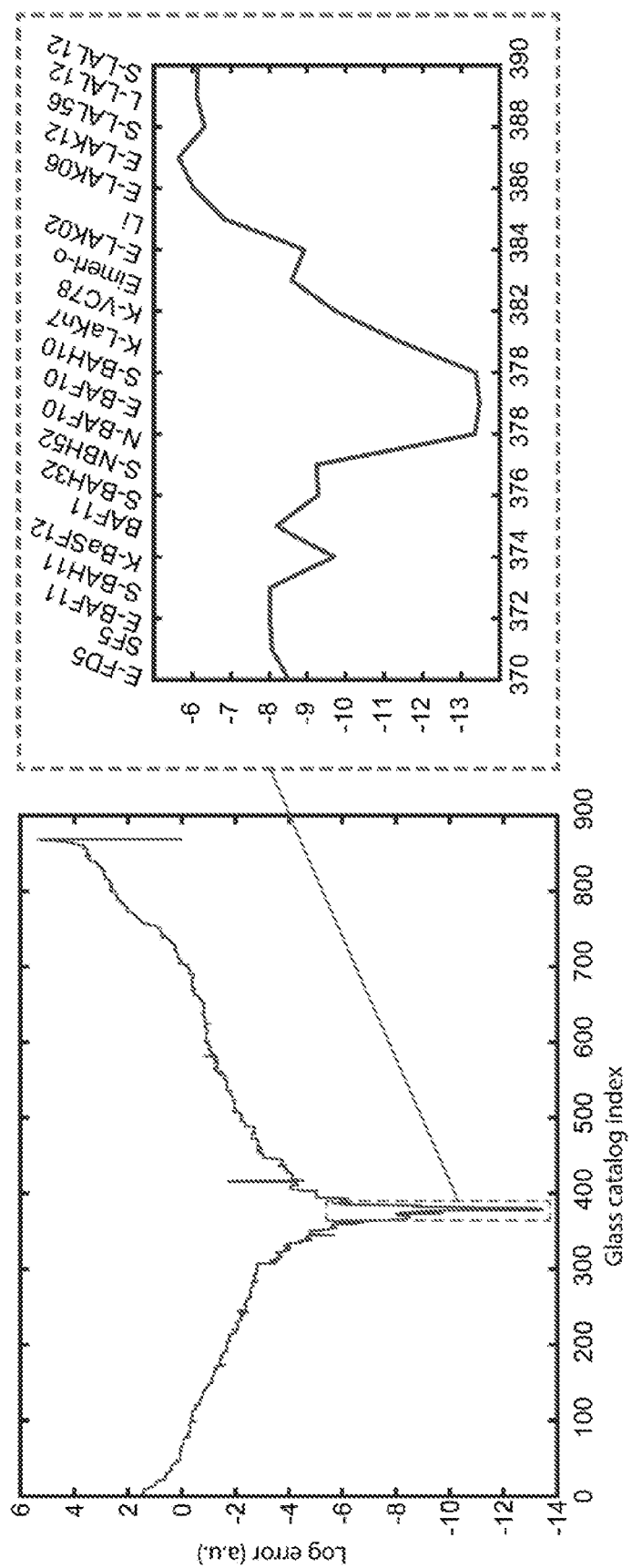

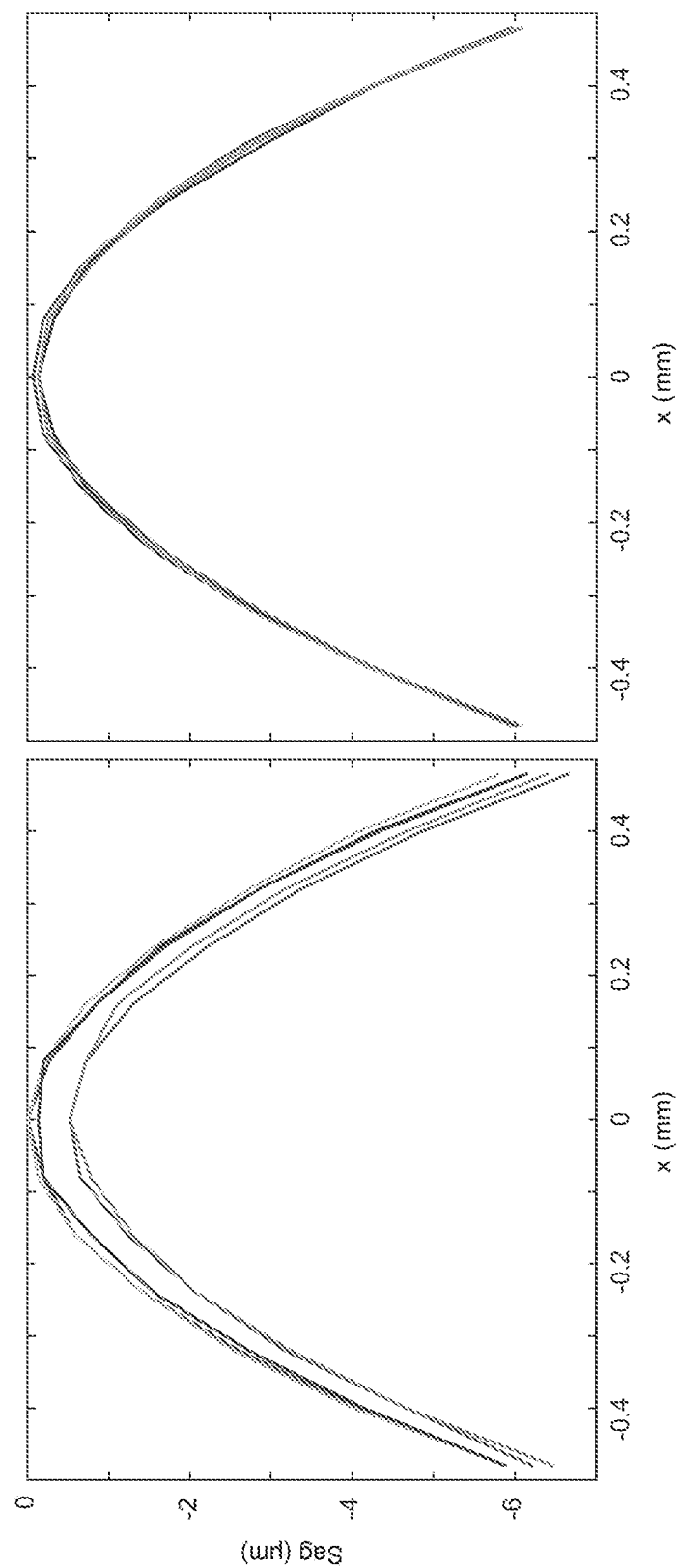

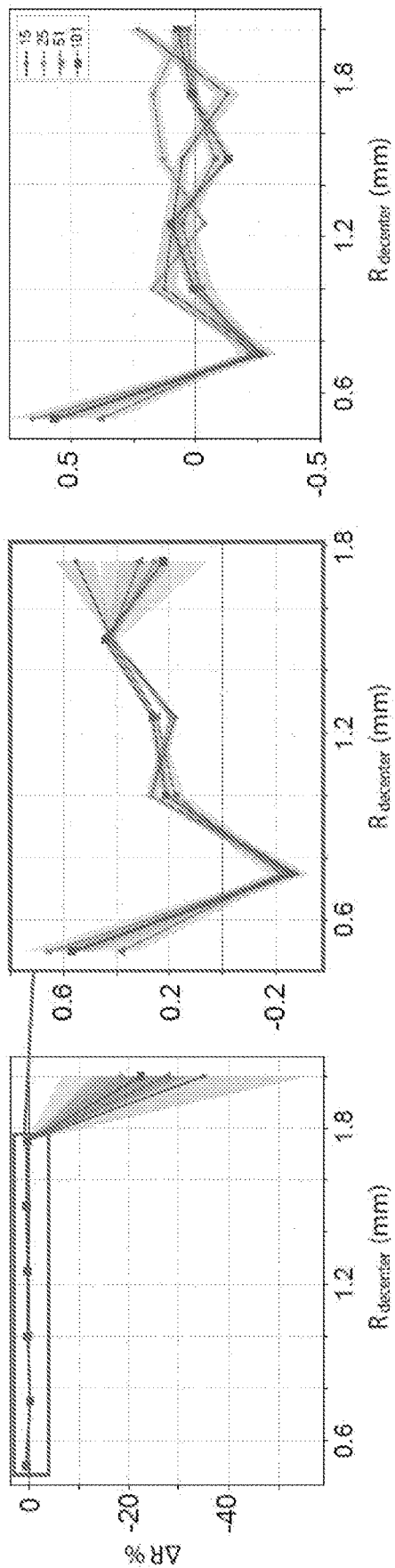

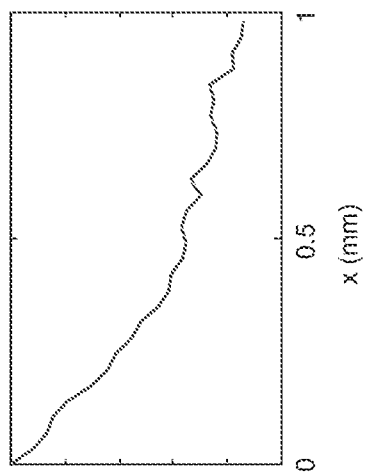
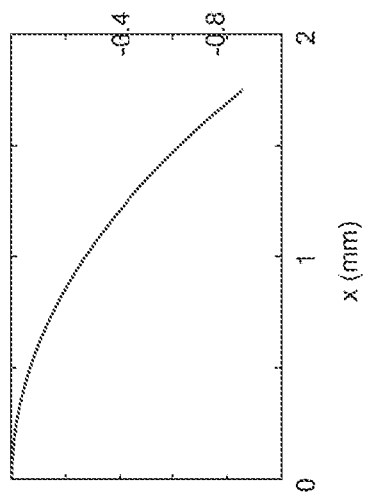
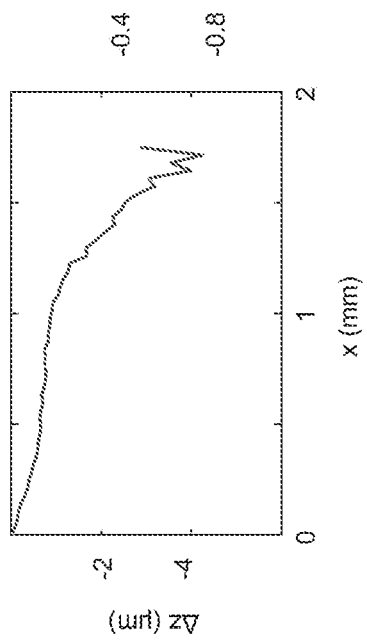
Fig. 12A
Fig. 12B
Fig. 12C

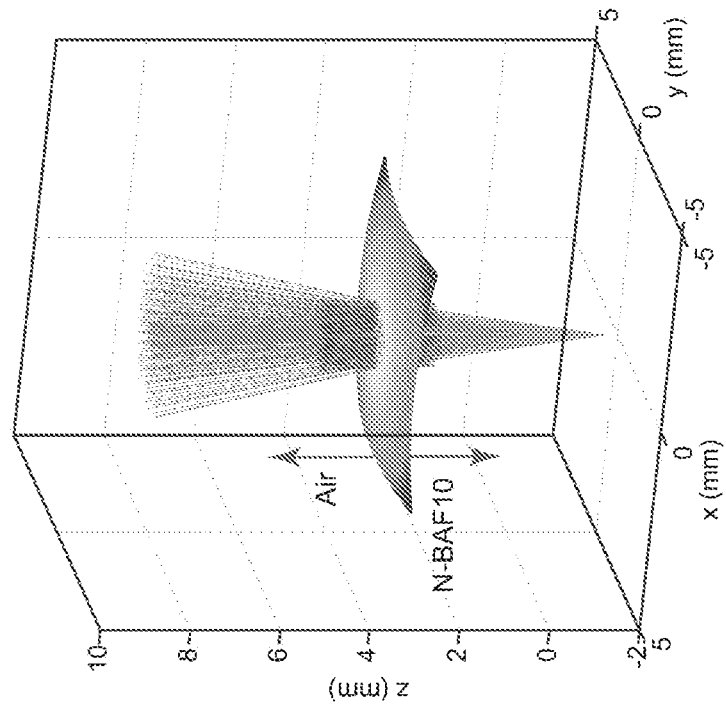
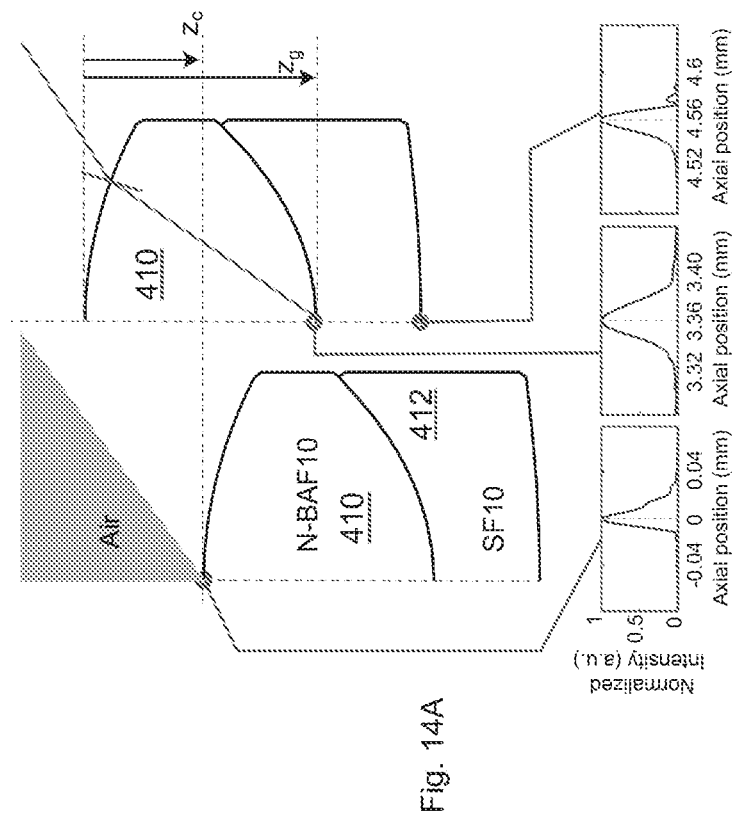
Fig. 14A
Fig. 14B
Fig. 14C

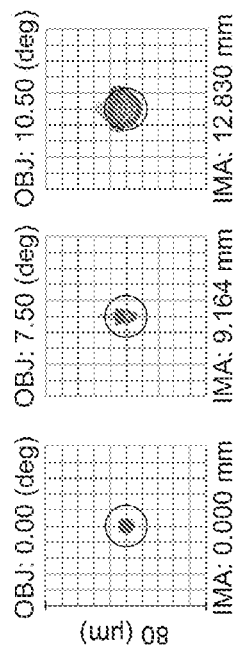
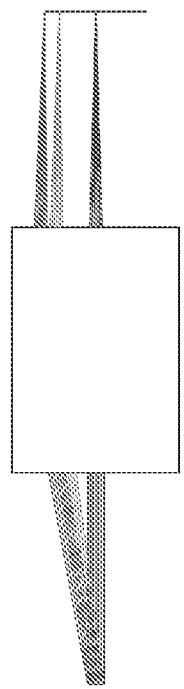
Fig. 15A
Fig. 15B
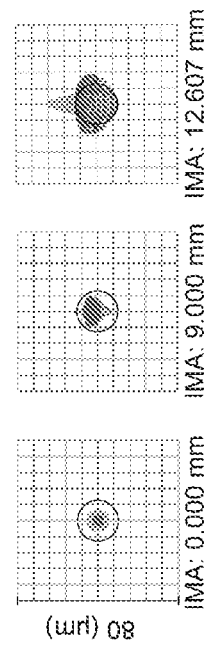
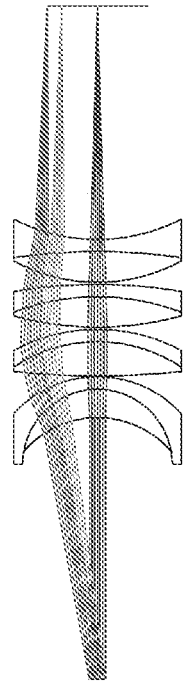
Fig. 15C
Fig. 15D

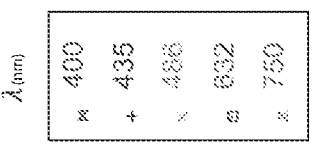
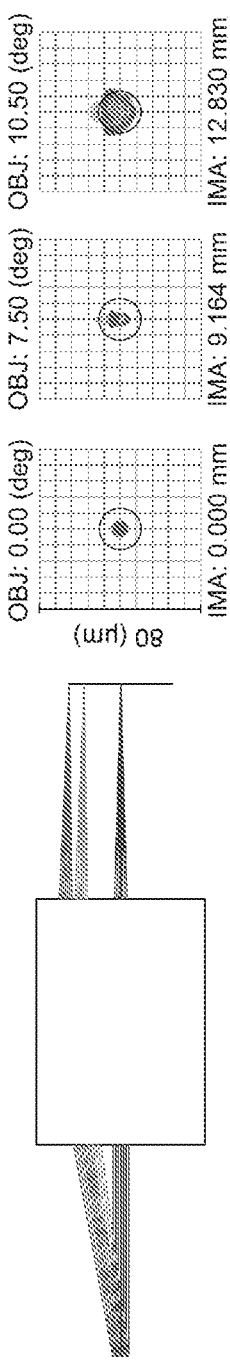
Fig. 16A
Fig. 16B
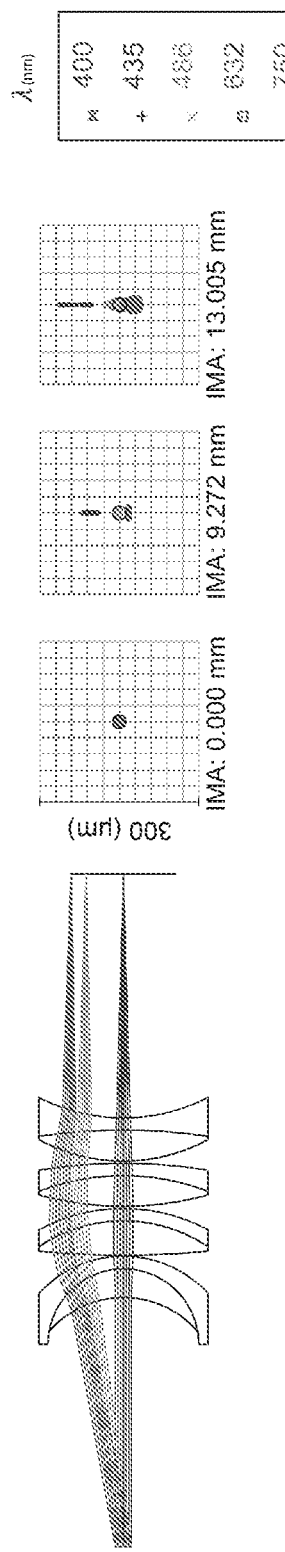
Fig. 16C
Fig. 16D
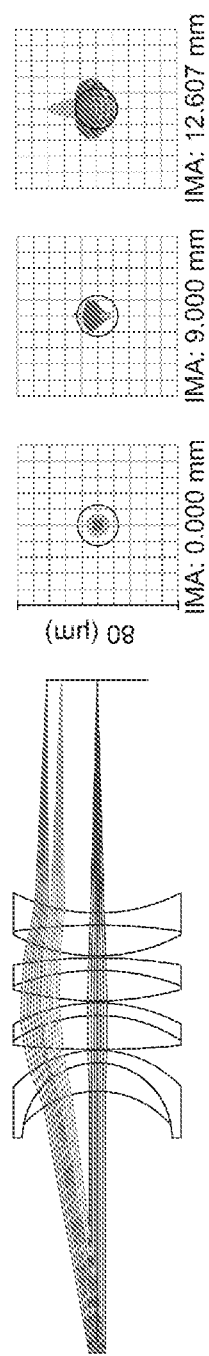
Fig. 16E
Fig. 16F

SYSTEMS AND METHODS FOR NON-DESTRUCTIVE EVALUATION OF OPTICAL MATERIAL PROPERTIES AND SURFACES

CROSS REFERENCE TO RELATED APPLICATIONS

This application is the U.S. national stage entry, under 35 U.S.C. $\S$ 371, of International Application Number PCT/US2019/015148, filed Jan. 25, 2019, which claims the benefit of U.S. Provisional Patent Application No. 62/622,577, filed on Jan. 26, 2018, the entire contents of each of which are hereby incorporated by reference.

TECHNICAL FIELD

The present disclosure relates to systems for evaluation of optical materials. More particularly, the present disclosure relates to non-destructive evaluation of properties and surfaces of optical materials.

BACKGROUND OF THE INVENTION

Design of optical imaging systems requires careful balancing of lens aberrations to optimize the point-spread function (PSF) and minimize field distortions. Aberrations and distortions are a result of both lens geometry and glass material. While many lens manufacturers provide optical models to facilitate system-level simulation and provide insight for the achievable optical performance, these models are often not reflective of true system performance because of manufacturing tolerances. Optical design can be further confounded when achromatic or proprietary lenses are employed. Achromats are often used in systems that utilize broadband sources due to their performance in balancing chromatic aberrations. Similarly, proprietary lenses may be custom-designed for optimal performance, but accurate computer models are often not available, and models based on wavefront sensing do not provide complete aberration information, since these measurements are field-specific and wavelength-specific.

The quest for deeper, sharper optical microscopy is invariably hindered by aberrations. With the plethora of advanced techniques that have increasingly become available for biological research, including light sheet microscopy (LSM), nonlinear, and super-resolution microscopy, the need for careful management of aberrations has been growing. LSM provides rapid three-dimensional and four-dimensional fluorescence imaging in biological samples using orthogonal illumination and detection axes, where optical sectioning is achieved by illuminating a thin sheet of light overlapping with the detection focal plane. However, aberrations may induce thickening of the light-sheet, degraded resolution, and up to two orders of magnitude reduction in signal-to-background ratio (SBR). Nonlinear microscopy techniques that are widely used in biological imaging include two-photon microscopy (TPM), second harmonic generation microscopy (SHG), and coherent anti-stokes Raman spectroscopy (CARS). In TPM, SHG, and CARS, the emitted signal varies nonlinearly with excitation intensity giving rise to intrinsic optical-sectioning where the signal emanates only from the focal plane. Furthermore, SHG and CARS rely on the phase distribution of the exciting field within the focal volume relative to the sample structure. Thus, aberrations in these systems result not only in loss of resolution, but in significant reduction of excitation efficiency as well.

Finally, super-resolution techniques enable nanometer-scale visualization of biological samples, beating the diffraction limit by several folds. Structured illumination microscopy (SIM) operates by projecting a sinusoidal illumination pattern, shifting higher spatial frequency components of the sample into the detection pass-band. Computational post-processing and deconvolution are performed to recover the true image. Single-molecule switching microscopy operates by localizing isolated molecules through stochastic excitation followed by finding the center of mass of a PSF model fitted to the detected emission. In stimulated emission-depletion (STED) microscopy, the sample is excited using a Gaussian beam similar to confocal or wide-field fluorescence. Excitation is immediately followed by a depletion beam with a donut-shaped PSF with zero intensity in the center. Super resolution (SR) in simulated emission depletion (STED) microscopy is achieved by ensuring that the lateral extent of the zero-center in the depletion beam PSF is much smaller than the diffraction limit. Aberrations are particularly detrimental to SR techniques due to the implied assumptions about the PSF shape, the high NA objectives that are typically employed, and the very high resolution regime of operation. Adaptive optical (AO) correction of system and sample aberrations has been utilized in conjunction with all of the aforementioned modalities. However, AO is expensive, increases the imaging system complexity, and can only correct for a finite range of aberrations. Thus, there is still a need for a well-designed aberration-free imaging system, even if AO is employed.

SUMMARY OF THE INVENTION

A mathematical framework of FT is first extended to spherical surfaces and a method is described that is based on optical coherence tomography (OCT) and reflectance confocal microscopy (RCM) for full characterization of lens geometry and glass materials. It is shown that OCT provides sufficient sensitivity to visualize intermediate surfaces of compound lenses near the optical axis. Furthermore, a generalized approach is described and is based on computational forward ray-tracing simulation and optimization using data from glass databases, which extends the utility of the method to arbitrary surface geometries. Finally, the characterization method on commercially available lenses is validated.

In some embodiments, a method for characterizing an internal surface of a sample comprises measuring the internal surface over x-y cross sections of the sample using interferometry. An electronic processor determines a distorted radius of curvature of the internal surface based on the interferometry measurements and determines an optical path length at each section based on the distorted radius of curvature. The electronic processor executes computational ray tracing to simulate refraction at any upstream surface relative to the internal surface and determines a cumulative optical path length at each section based on the ray tracing. A residual optical pathlength is determined at each section by the electronic processor based on the optical path length and the cumulative optical pathlength. The electronic processor scales the residual optical pathlengths by the sample's group index and propagates rays based on phase index. The electronic processor executes fitting of the sample surface and determine a corrected radius of curvature of the internal surface of the sample.

In some embodiments, a method for characterizing a lens element comprises measuring an external surface of the lens element using interferometry and determining, by an electronic processor, a radius of the lens element and a center of curvature of the lens element based on the interferometry measurement. The lens element is centered relative to an illumination beam and a focal plane position is measured for each surface of the lens element using RCM. An electronic processor determines a difference between the measured focal plane positions to determine an optical thickness based on the difference of focal plane positions. For each surface of the lens elements: 1) the surface is translated to the focal plane position of the surface, 2) path length matching is performed with a reference arm and a sample arm in the interferometer, 3) the reference arm of the interferometer is translated to positions corresponding to stationary phase points for three wavelengths, and 4) per-color path length matching of the reference arm and the sample arm in the interferometer is performed for each of the three wavelengths. The electronic processor further determines an optical path length for each of the three wavelengths based on the per-color path length matching. The electronic processor further performs computational ray tracing based on the radius of the lens element, the optical thickness of the focal plane positions, and the optical path lengths for each of the three wavelengths, to determine parameters for properties of the lens element.

In some embodiments, a system for characterizing optical properties and surfaces comprises a light source, an interferometer; an image detector; a sample-under-test, and an electronic processor coupled to a memory comprising instructions. When executing the instructions, the electronic processor is configured to determine a distorted radius of curvature of an internal surface of the sample-under-test based on interferometry measurements of the internal surface over sections. The electronic processor further determines a distorted radius of curvature of the internal surface based on the interferometry measurements and determines an optical path length at each section based on the distorted radius of curvature. The electronic processor further executes computational ray tracing to simulate refraction at all upstream surfaces relative to the internal surface and determine a cumulative optical path length at each section based on the ray tracing. The electronic processor further determines a residual optical pathlength at each section based on the optical path length and the cumulative optical pathlength, scales the residual optical pathlengths by the sample's group index, and propagates rays based on phase index. The electronic processor further executes fitting of the sample surface and determines a corrected radius of curvature of the internal surface of the sample.

Other aspects of the invention will become apparent by consideration of the detailed description and accompanying drawings.

BRIEF DESCRIPTION OF THE DRAWINGS

FIGS. 8A-B illustrates identification of glass G2 (of FIG. 4) using computational ray-tracing simulation, in accordance with some embodiments.

FIGS. 10A-10B illustrate surface sag plots from repeated acquisitions (n=5) of a lens surface profile using (a) a fiber, and (b) free-space based Michelson interferometer, in accordance with some embodiments.

FIGS. 11A-11C illustrate the effect of SNR thresholding on radius measurement accuracy, in accordance with some embodiments.

FIGS. 12A-12C illustrate the deviation between measured and expected surface sag of the reference sphere, in accordance with some embodiments.

FIGS. 14A-14G graphically illustrate glass material identification, in accordance with some embodiments.

FIGS. 15A-15D graphically illustrate a ray-trace and spot diagram comparison of optical performance, in accordance with some embodiments.

FIGS. 16A-16F graphically illustrate a ray-trace and spot diagram comparison of optical performance, in accordance with some embodiments.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Optical coherence tomography (OCT) provides non-contact, depth-resolved imaging with 1-10 μm axial resolution and >100 dB sensitivity. OCT has been previously used to measure the refractive index of unknown materials. Measured path-lengths in OCT are scaled with the group refractive index of the sample. Thus, in a homogenous sample, the group refractive index is obtained as the ratio between the measured optical and geometric thicknesses of the sample. In heterogeneous samples, a method called focus-tracking (FT) quantifies the effect of focal-plane shift introduced by the geometry and the phase refractive index of the sample. This provides an additional mathematical relation that enables simultaneous measurement of the thickness and refractive index of intermediate sample layers. FT has been previously demonstrated using time-domain OCT and multimodal confocal-OCT systems, but these previous studies were only limited to flat surfaces. Furthermore, these methods approximate the relation between the phase and group refractive index, which limits the accuracy of the resulting measurements.

Figure 1:
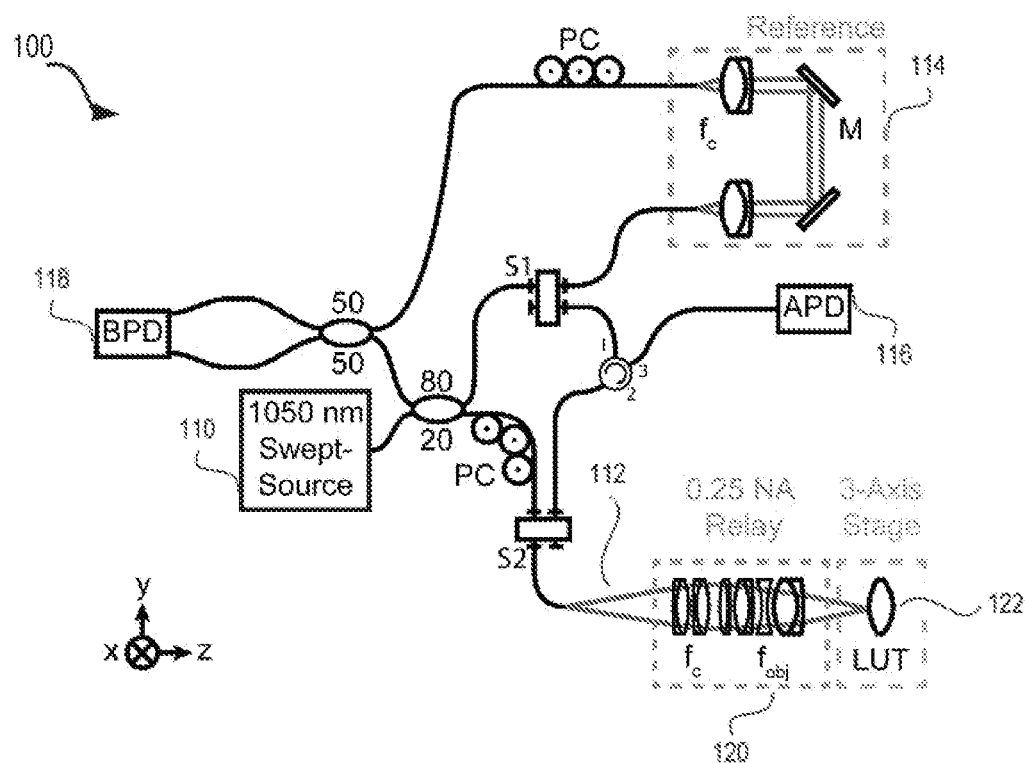
FIG. 1 is a schematic representation of a lens characterization system capable of optical coherence tomography (OCT) and reflectance confocal microscopy (RCM), in accordance with some embodiments.

FIG. 1 is a schematic representation of a lens characterization system capable of OCT and RCM. Referring to FIG. 1, a system 100 includes a laser source 110, a sample arm 112, a reference arm 114, an avalanche photo diode detector 116, a balanced photo diode detector (BPD) 118, and imaging relay 120.

Light from the laser source 110 is split by an 80:20 coupler into the reference arm 114 and sample arm 112. Two fiber switches S1 and S2 enable selection between OCT and RCM imaging. A 3-axis motorized stage is used to scan a sample lens-under-test 122. Also shown are collimating and objective lenses (f), polarization controllers (PC), and a broadband fiber-optic circulator.

Lens characterization was performed using a custom-built SS-OCT and RCM system 100 with a 200 kHz, 1050±50 nm swept-laser 110 (e.g., SSOCT-1060, Axsun Technologies). The laser source 110 output was split by a broadband 80:20 fiber coupler (e.g., AC Photonics). As noted, two mechanical fiber switches (S1 and S2) enabled selection between OCT and RCM. For OCT imaging, the outputs of the 80:20 coupler were connected to the reference arm 114 and the sample arm 112. For RCM imaging, the 80% arm of the coupler provided illumination to the sample lens-under-test 122 through port 2 of a broadband fiber-optic circulator (e.g., AC Photonics), and the reflected signal was detected through port 3 of the circulator using the avalanche photodiode 116 (e.g., RDC1-JJAF, Voxtel).

The elements in FIG. 1 are merely exemplary. For example, while FIG. 1 shows that the image sensor 116 is an avalanche photodiode and the image sensor 118 is a balanced photo diode, this disclosure is not so limiting. In practical implementations, the image sensor 116 may be any image sensor capable of converting incident radiation into analog or digital signals, and may include sensors such as Complementary Metal-Oxide Semiconductor (CMOS) image sensors (CISs), Charge-Coupled Devices (CCDs), avalanche photodiodes (APDs), balanced photodetectors (BPDs), and the like. As illustrated in FIG. 1, the image sensor 116 is an APD. The image sensor 118 may be any image sensor capable of converting incident radiation into analog or digital signals, such as CISs, CCDs, APDs, BPDs, and the like. As illustrated in FIG. 1, the image sensor 118 is a BPD. Furthermore, the laser source 110 is shown as a swept laser. However, the light source 110 may be any light source capable of emitting light having a particular wavelength or wavelength band, such as a laser diode, a light-emitting diode (LED), a superluminescent diode (SLD), an organic electroluminescent device (OELD), a high-pressure discharge lamp, and the like. As illustrated in FIG. 1, the light source 110 is a swept-source laser.

An OCT signal-to-noise ratio (SNR) was measured at 102 dB for a sample arm 112 power of 2.7 mW, which provided sufficient sensitivity to image a refractive index difference of $1.5 \times 10^{-5}$. The OCT axial resolution was 7.3 µm in air. The reference arm 112 was built using a retroreflector and a motorized translational stage (LTS150, Thorlabs). The sample arm 112 included a custom-designed imaging relay 120 with a 0.25 numerical aperture (NA) and 20 mm working distance, and provided a confocal full-width at half-maximum (FWHM) axial resolution of 14 µm at the center wavelength.

In order to measure the radius of curvature of the sample lens-under-test 122, the surface of the lens-under-test 122 was first sampled laterally and a spherical-fit was performed on the acquired data using least squares minimization in MATLAB (Mathworks) to obtain both the radius and the center of the imaged surface. Scanning in the sample arm 112 was performed using a 3-axis motorized stage assembly (e.g., MLS203-1 and MTS25-Z8, Thorlabs) to avoid confounding aberrations and field distortions inherent to galvanometer mirror-scanning imaging systems.

A similar protocol was followed to measure the internal curvature of the sample lens-under-test 122. The image of the internal curvature was distorted both by refraction and path-length scaling by the group index of the glass material. Thus, prior to sphere fitting for radius estimation, three-dimensional ray tracing was performed in MATLAB for distortion correction based on the outer surface radius and the characterized glass material, which is further described below.

Figure 2:
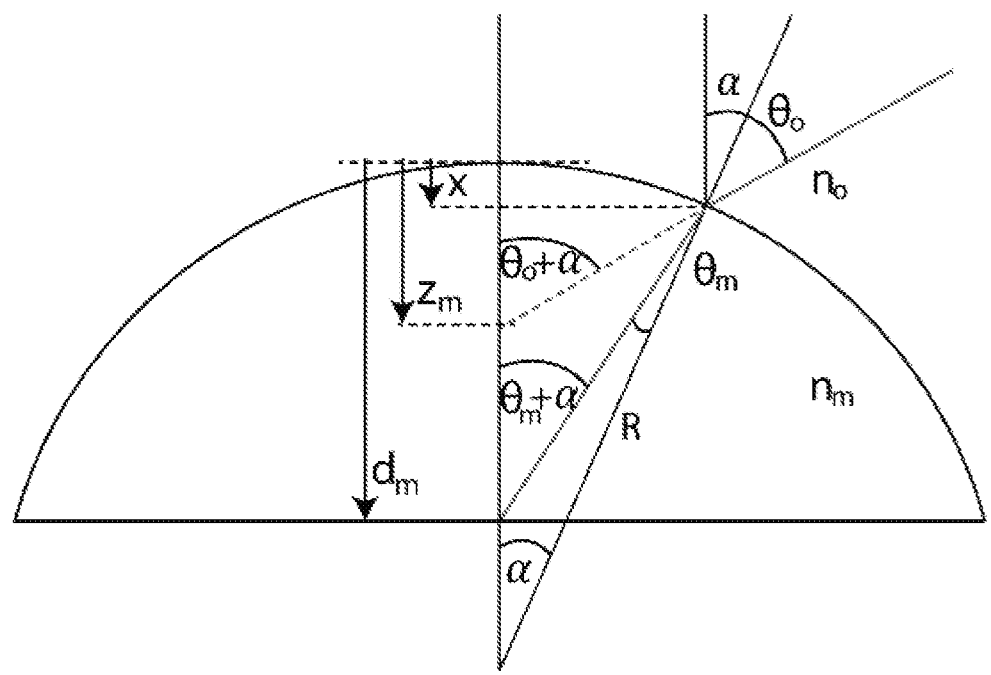
FIG. 2 illustrates refraction of the marginal ray across a spherical surface, in accordance with some embodiments.

FIG. 2 illustrates refraction of a marginal ray across a spherical surface. The marginal ray is depicted by a solid red line. A red dashed line indicates the un-refracted path with an angle that is set by the illumination numerical aperture (NA). FIG. 2 also illustrates the geometric thickness ($d_m$), sample arm displacement ($z_m$), surface sag (x) at the point of incidence, radius of curvature (R), angle of incidence ($\theta_o$), angle of refraction ($\theta_m$), refractive index of outer medium ($n_o$), refractive index of inner medium ($n_m$), and angle of the surface normal at the point of incidence ($\alpha$).

Mathematical analysis of a focal-plane shift was performed by applying Snell's law on the marginal ray of the focused beam. The derivation for convex spherical surfaces is given by the following set of equations:

$$n_m \sin(\theta_m) = n_o \sin(\theta_o) = n_o \sin(\sin^{-1}(NA) - \alpha)$$

$$x = R - R\cos(\alpha)$$

$$R\sin(\alpha) = (z_m - x)\tan(\sin^{-1}(NA)) \tag{1}$$

$$\theta_m = \tan^{-1}\left(\frac{(z_m - x)\tan(\sin^{-1}(NA))}{\frac{t_m}{n_g} - x}\right) - \alpha \tag{2}$$

where subscripts 'o' and 'm' denote outer and inner media, respectively, $t_m$ represents the measured optical thickness, and $z_m$ represents the sample arm displacement to move the focal plane from the upper surface to the inner surface of the sample lens-under-test 122. A similar treatment for concave surfaces yields the same set of equations, but with an opposite sign for x.

Focus tracking was performed using RCM imaging of the front and back surfaces of the unknown sample lens-under-test 122 material. For accurate localization of the focal plane position, the sample lens-under-test 122 was translated axially along the optical axis of the imaging relay 120. Through-focus measurements of the reflectance were obtained for each surface, which traced the confocal axial response of the imaging relay 120. The position of the best focus was identified with sub-micron accuracy by a computer program by taking a weighted mean of the positions at which the intensity remained within 5% of the peak. Measurements were performed at the central 2 nm of the spectrum to avoid broadening of the axial response from chromatic aberrations.

One identifying property of a glass material is dispersion. Information about the dispersive properties of the glass material of the lens-under-test 122 was obtained by evaluating the optical thickness of the lens material at different wavelengths using OCT. One surface of the lens-under-test 122 was first brought to its corresponding focus as identified in the previous step, and the reference arm 114 position was then adjusted to match the path-lengths of the reference arm 114 and the sample arm 112. The sample was then moved to bring the second surface of the lens-under-test 122 into its corresponding focus, and path-length matching of the sample arm 112 and the reference arm 114 was repeated. The sum of the sample arm 112 shift ($z_m$, of FIG. 2) and the reference arm 114 shift is equal to the optical thickness of the material.

Figure 3:
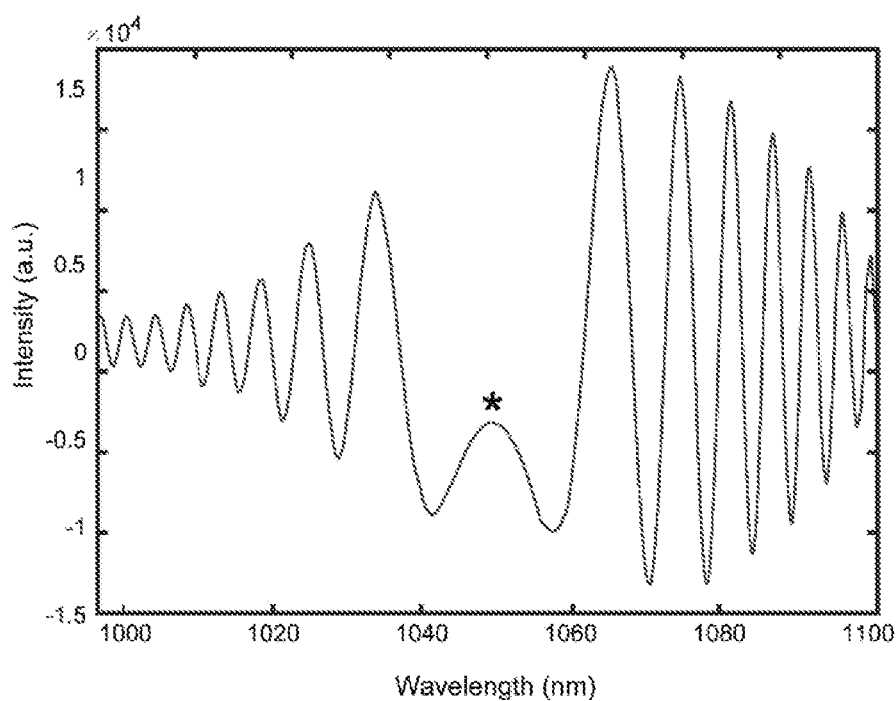
FIG. 3 is a representative OCT interferogram after matching the reference arm and sample arm path-lengths, in accordance with some embodiments.

FIG. 3 is a representative OCT interferogram after matching the reference arm and sample arm path-lengths. The position of the stationary phase point (asterisk) indicates the wavelength at which the path-length mismatch is minimized, which arises from the dispersion mismatch between the sample arm and the reference arm. The stationary phase point is the position of the lowest frequency in the interferogram, which arises from dispersion mismatch between the reference and the sample arm, and indicates the wavelength at which the path-length mismatch is minimized (FIG. 3). The optical thickness at different wavelengths was thus obtained by adjusting the reference arm position to place the stationary phase point in at the beginning, center, and end of the spectrum ($\lambda$=995, 1050, 1110 nm, respectively).

The optical properties of the known commercial glass types within the illumination bandwidth were generated using an open-source database. Numerical analysis was performed using equations (1) and (2) and the measured parameters to find the correct glass type. However, numerical analysis suffered several drawbacks including: 1) a trade-off between achievable decimal precision and execution time, which led to rounding errors, 2) inherent limitation to spherical surfaces, and 3) assumptions about relative orientation between the surface and the illumination beam.

To address these issues, a computational forward raytracing approach was developed. The acquired surface data from the radius of curvature measurements (described above) were used as a 3D representation of the surface, which also holds information about the relative orientation of illumination beam. For each glass type, the phase index and group index at the central wavelength were used to simulate the propagation of the chief and marginal rays. The simulated and the measured parameters were then compared to find the glass types that minimized the following error function:

$$\sigma = (z_m - \tilde{z}_m)^2 + (t_m - \tilde{t}_m)^2 + (2d_m(\Delta n_g - \Delta \tilde{n}_g))^2 \qquad (3)$$

where the tilde indicates a simulated value, $d_m$ is the calculated geometric thickness of the sample based on the glass group index and the center wavelength, the factor of 2 accounts for double passing through the unknown material, and $\Delta n_g = n_g|_{\lambda=995\ nm} - n_g|_{\lambda=1100\ nm}$. The results of this approach were then compared to the results of numerical analysis for verification.

Figure 4:
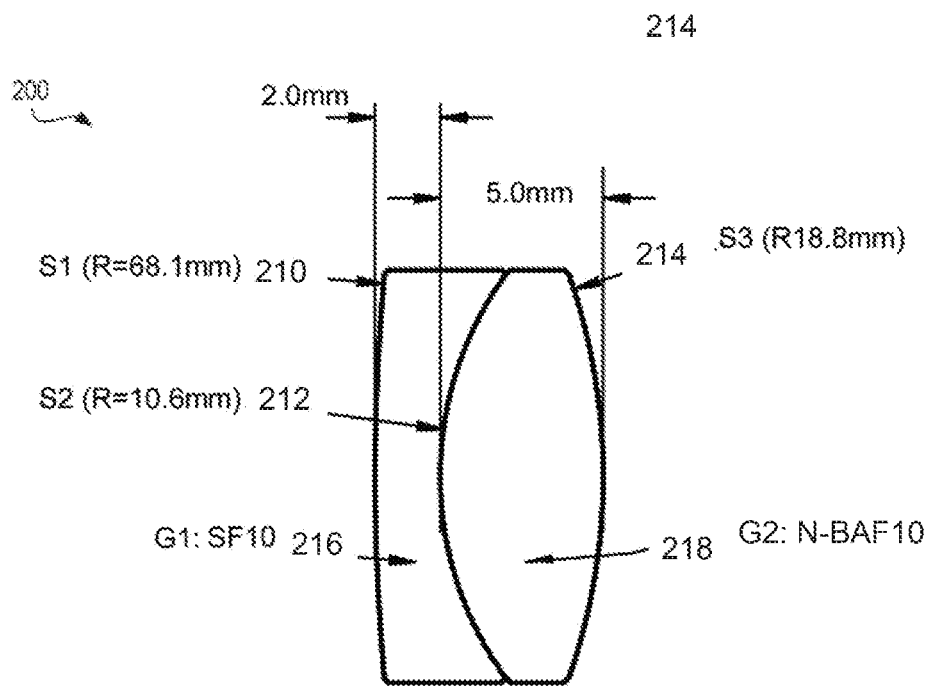
FIG. 4 illustrates specifications of a commercial achromatic doublet lens used for validation of the lens characterization method, in accordance with some embodiments.

FIG. 4 illustrates specifications of a commercial achromatic doublet lens used for validation of the lens characterization method. A cemented achromatic doublet lens 200 (e.g., AC127-025-A, Thorlabs) was characterized. Referring to FIG. 4, surfaces (S) of the lens 200 include S1 210, S2 212, and S3 214, in the order in which they were characterized. Glass types (G) of the lens 200 are referred to as G1 216 and G2 218. To perform focus tracking, the lens 200 was translated along the optical axis of the imaging relay 120 at steps of 0.5 µm to trace the confocal axial response at each surface S1 210, S2 212, and S3 214.

Figure 5:
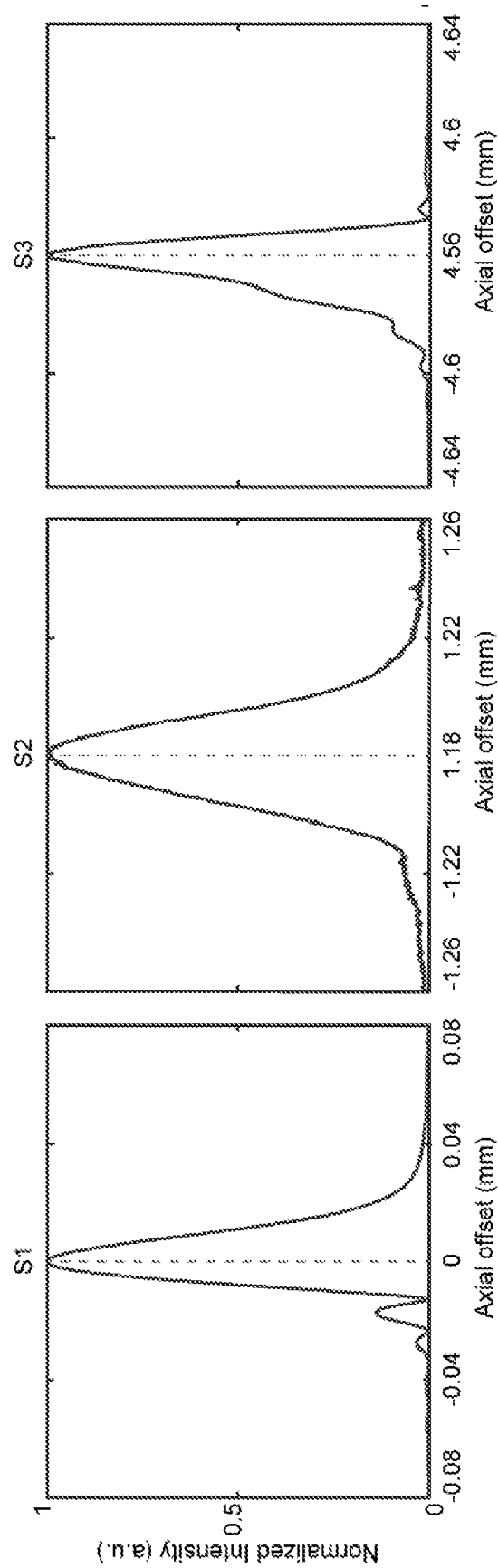
FIG. 5 illustrates the results of focus tracking at each surface of the lens described with respect to FIG. 4, in accordance with some embodiments.

FIG. 5 illustrates results of focus tracking at each surface S1 210, S2 212, and S3 214 of the lens 200. FIG. 5 shows the recorded intensity profiles received from the APD 116 and the identified focus position for each surface S1 210, S2 212, and S3 214. The plots indicate the confocal axial response of the imaging relay 120 at each surface S1 210, S2 212, and S3 214, with visible reduction of the SNR at S2 212 due to the reduced reflectivity. The dashed lines show the positions of focus for S1 210, S2 212, and S3 214 calculated from the weighted mean of the points within 5% of peak intensity.

Figure 6B:
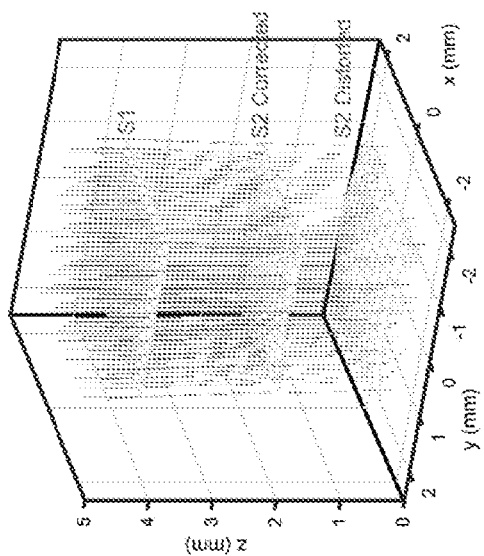
FIGS. 6A-6B graphically illustrate radius of curvature measurement results and surface distortion corrections, in accordance with some embodiments.
Figure 6A:
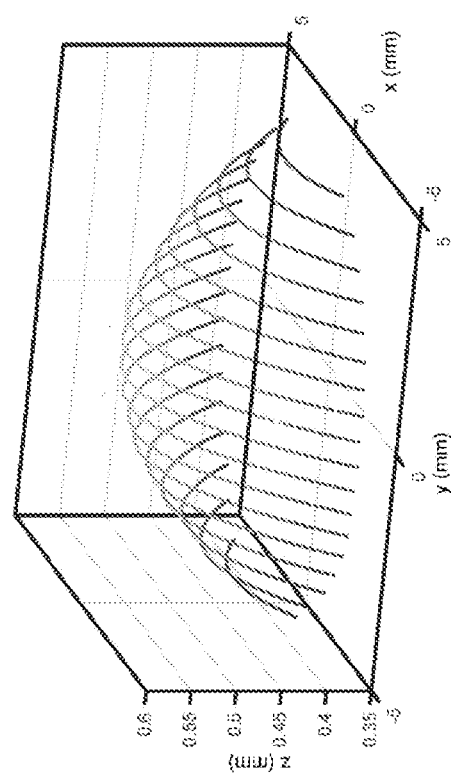

FIGS. 6A-6B graphically illustrate radius of curvature measurement results and optical distortion corrections. FIG. 6A represents a raw point cloud based on S1 210 measurements of lens 200. FIG. 6B represents computational ray tracing over meshes of surfaces S1 210 and S2 212 of lens 200. The distorted surface S2 212 was corrected based on the identified type of glass G1 216 to compensate for the optical distortions and determine the true radius of surface S2 212

In order to measure the radius, each of the surfaces of lens 200 was imaged using OCT over a 5×5 mm rectangular grid, at a sampling density of 200×20 for the x- and y-axes, respectively. The surfaces were segmented automatically in electronic post-processing, and a spherical fit was performed. The radii of surfaces S1 210 and S3 214 were found to be 69.1 mm, and 18.88 mm, respectively. The radius of surface S2 212 was 7.3 mm, and 10.56 mm after glass identification, and correction of optical distortions (FIG. 6B).

Figure 7A:
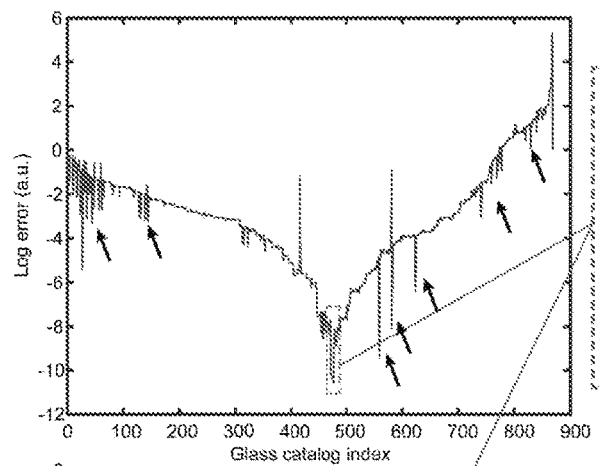
FIGS. 7A-7D graphically illustrate identification of glass G1 (of FIG. 4) based on focus tracking, optical thicknesses and measured S1 radius, in accordance with some embodiments.
Figure 7B:
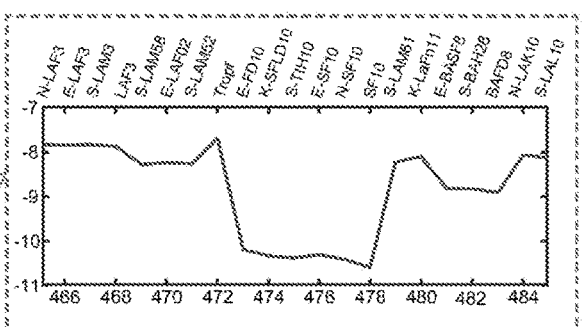
Figure 7C:
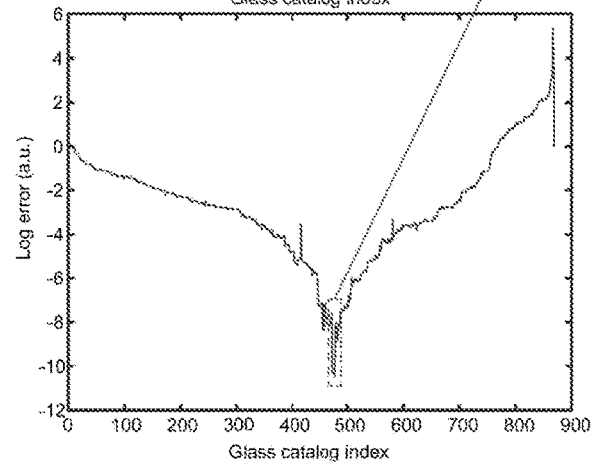
Figure 7D:
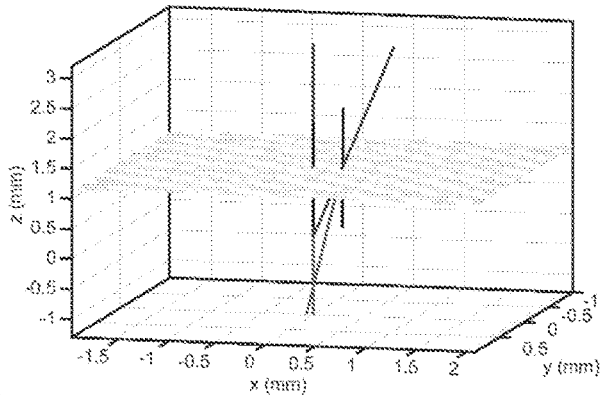

FIGS. 7A-7D graphically illustrate identification of glass G1 216 based on focus tracking, optical thicknesses, and measured radius of the surface S1 210, of lens 200. FIG. 7A is a plot of log($\sigma$) against the glass database using the numerical solution of equations (1) and (2). The arrows point at spurious peaks due to rounding errors from the limited precision of the numerical solution. FIG. 7B is an enlargement of the red box shown in (FIG. 7A) that shows the optimal glass types. FIG. 7C is a plot of log($\sigma$) obtained using computational ray-tracing, which shows agreement with the numerical solution with suppression of rounding errors. FIG. 7D graphically illustrates computational ray-tracing results for simulation of ray propagation through surface S1 210 of lens 200 using the measured parameters. The blue lines represent the incident chief and marginal rays of the optical relay in air at the point of characterization. The black lines represent normals to the surface S1 210 at the points of intersection with the incident rays. The red lines show the refraction after penetrating the surface S1 210 based on the identified glass type (SF 10).

Glass G1 216 of lens 200 was identified as SF10 or a similar variant. Table 1 confirms the similarity in the optical properties of all the identified types within the global minimum shown in FIG. 7B. As shown in FIGS. 7A-7C, both the numerical analysis and the ray-tracing simulation showed similar error profiles. Rounding errors in the numerical analysis resulted in spurious minima in the error function. The group index of the identified glass type was used to calculate the geometric thickness between S1 210 and S2 212 as 2.02 mm.

TABLE 1

Identified glass types for glass G1 216

| Glass | Phase index | Group index | Abbe number |
|---|---|---|---|
| E-FD10 | 1.702264 | 1.729978 | 28.32 |
| K-SFLD10 | 1.702357 | 1.729878 | 28.45 |
| S-TIH10 | 1.702375 | 1.729849 | 28.46 |
| E-SF10 | 1.702377 | 1.729906 | 28.45 |
| N-SF10 | 1.70248 | 1.729752 | 28.53 |
| SF10 | 1.702568 | 1.728923 | 28.40 |

FIGS. 8A-8B illustrate identification of glass G2 218 using computational ray-tracing simulation. As shown in FIGS. 8A-8B, glass G2 218 was identified as S-BAH10. Table 2 confirms the similarity in the optical properties of the identified types. The group index of the identified glass type was used to calculate the geometric thickness between S2 and S3 as 5.04 mm.

TABLE 2

Identified glass types for glass G2 218

| Glass | Phase index | Group index | Abbe number |
|---|---|---|---|
| N-BAF10 | 1.654257 | 1.673075 | 47.11 |
| E-BAF10 | 1.654294 | 1.673076 | 47.23 |
| S-BAH10 | 1.654297 | 1.673047 | 47.23 |

A method for full characterization of compound lenses using OCT and RCM is presented. Characterization of physical lens parameters leads to more accurate optical simulations and has benefits in optical design and lens manufacturing. White light interferometry may be advantageous in dispersion characterization, since glass types are usually more dispersive in the visible light regime than in the near-infrared (NIR). However, due to the typically lower sensitivities achieved with white light systems compared to NIR, combining an NIR system may still be useful for accurate imaging of the intermediate curvatures. The accuracy of the material characterization may also be further increased by interrogating at different points of incidence, to introduce more geometric diversity to the measurements. This is possible through the ray-tracing simulation approach, since it holds inherent information about the relative orientation between the beam and the sample. Furthermore, this approach makes the method generalizable to arbitrary surface geometries. Thus, the method may be applied in modeling optical analogues of biological samples for optical simulation by finding glass types that approximate the sample properties. However, this assumes that for each imaged layer the refractive index is locally homogenous and is not suitable for a sample with a smoothly varying refractive index.

Custom laboratory microscopes often integrate commercial optical components in nonstandard configurations for which aberration information may not be readily available; including wavelength range, field-of-view (FOV), or immersion medium. This precludes accurate system-level simulation of the optical design, and leads to suboptimal performance. For example a cranial window, typically employed for brain imaging and placed after the objective, acts as a nonstandard immersion medium. This represents a source of significant aberrations that has been shown to reduce signal in TPF by >5-fold if not corrected. Similarly, optimizing a two-photon excited fluorescence (TPF) imaging system for custom objective and scan lens designs yielded a FOV more than 50 times larger than commercial counterparts.

Information about an optical element for design purposes may be obtained in the form of aberrations and distortions using wavefront sensing techniques; or in the form of a ray-transfer matrix using optical ray-tracing. Quantitative aberration information is useful in guiding the optical design, but is challenging to directly include in a simulated model. The ray-transfer matrix is a powerful method for modeling optical systems, yet it does not provide phase information, and is only valid in the paraxial approximation. Furthermore, using either approach, the obtained measurements are only valid for the characterized configurations including wavelengths, fields, and propagation direction. Therefore, estimating the full prescription of an unknown optic remains essential for overcoming the aforementioned limitations.

Coherence-gated imaging techniques such as low coherence interferometry (LCI), and OCT provide axial-priority imaging in transparent and semi-transparent media with resolutions down to 1 μm and sensitivities exceeding 100 dB. LCI and OCT have been previously demonstrated for surface profilometry, measurement of internal thicknesses of optical assemblies and biological samples, and estimation of internal curvatures. However, since the measured path lengths are proportional to the group velocity of the illumination wavelength bundle in the propagation medium, the optical properties of the medium need to be known a priori for accurate reconstruction of the imaged geometry. Since LCI-based techniques utilize broadband sources, many of these methods relied on approximating the phase refractive index ($n_p$) and the group refractive index ($n_g$), which limited the accuracy of the obtained measurements. This approximation may be avoided by introducing additional measurements to separate $n_p$ and $n_g$ through estimation or direct measurement of the dispersion parameter. However, these measurements were typically performed in transmission, and assumed a homogenous sample, and thus were not suitable for characterization of compound optical elements. Furthermore, methods relying on focus-tracking only traced the intersection between the marginal and the chief ray, and assume a locally flat surface.

A method is provided for characterization of compound optical lenses using RCM, low-coherence interferometry (LCI), and computational ray-tracing. Measurements are taken of external and internal surface radii, internal glass and air-gap thicknesses, and estimation of glass materials from a finite set of commercially available types. The method is validated based on a set of six commercial achromatic doublet lenses (Table 3), and characterization of a commercial scan lens comprising four doublets is demonstrated. This method addresses a gap in the design of optical imaging systems and manufacturing of optical components.

Figure 9A:
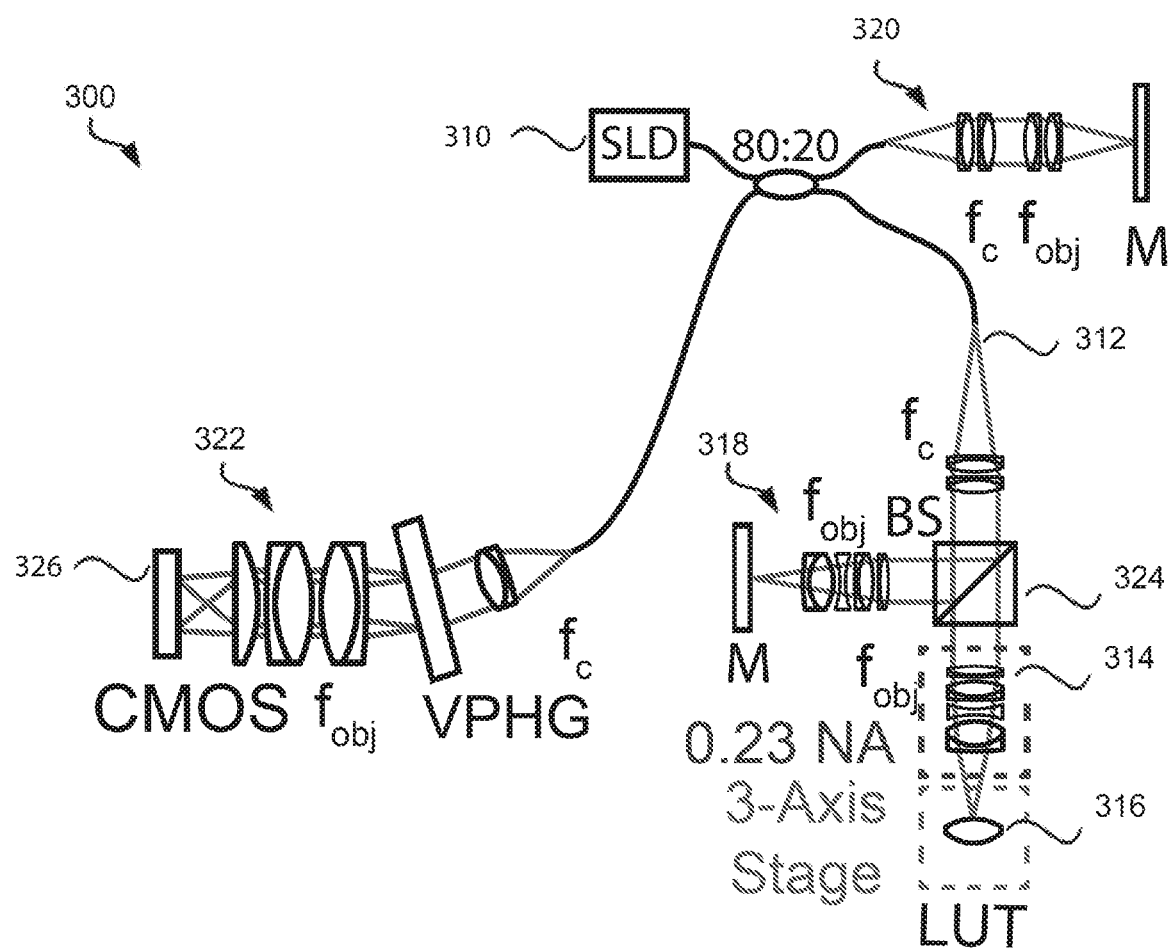
FIGS. 9A-9E illustrate a lens characterization system and calibration data, in accordance with some embodiments.

FIGS. 9A-9E illustrate a lens characterization system and calibration data. FIG. 9A is a schematic representing a lens characterization system 300 that includes a light source 310, a sample arm 312, an image relay 314, a lens-under-test (LUT) 316, an interferometer reference arm 318, a reference arm 320, a spectrometer 322, and a beam splitter 324. The image relay 314, the interferometer reference arm 318, the beam splitter 324, and the lens-under-test 316 form a Michelson interferometer. The lens characterization system 300 is capable of OCT and RCM. 20% of the light source 310 was relayed to the free-space Michelson interferometer (314, 316, 318, and 324) with 0.23 image space numerical aperture (NA). The back-coupled signal was detected using the custom-built spectrometer 322. VPHG refers to volume phase holographic grating. The symbol f refers to lenses. The lens characterization system 300 may also be referred to as an imaging system.

The elements in FIG. 9A are merely exemplary. For example, while FIG. 9A shows that the image sensor 326 of the spectrometer 322 is CMOS sensor, this disclosure is not so limiting. In practical implementations, the image sensor 326 may be any image sensor capable of, converting incident radiation into analog or digital signals, and may include sensors such as CISs, CCDs, APDs, BPDs, and the like. As illustrated in FIG. 9A, the image sensor 326 is a CIS. Furthermore, the light source 310 is illustrated as a super luminescent diode. However, the light source 310 may be any light source capable of emitting light having a particular wavelength or wavelength band, such as a laser diode, an LED, an OELD, a high-pressure discharge lamp, and the like.

LCI measurements of external lens surfaces of the lens-under-test T 316 were performed using a broadband free-space Michelson interferometer (314, 316, 318, and 324) detected on a custom-built spectrometer 322. See also FIGS. 10A-10B. System sensitivity was 96.2 dB for 720 μW incident power at the lens-under-test 316 and 3.5 μs spectrometer exposure. LCI axial resolution was 2.17 μm in air, and a 0.23 numerical aperture (NA) sample objective 314 was used for epi-illumination and collection. Aberrations and field distortions in the system were minimized by translating the lens-under-test 316 relative to a stationary focus using a 3-axis motorized stage assembly. External lens surfaces of the lens-under-test 316 were sampled along orthogonal (x- and y-) axes, and these depth cross-sections of the lens 316 surface (see FIG. 9C) were segmented using the peak positions of each axial reflectivity profile. The resulting point cloud was fit to a sphere by least-squares minimization to obtain the lens external radius and center of curvature.

Figure 9B:
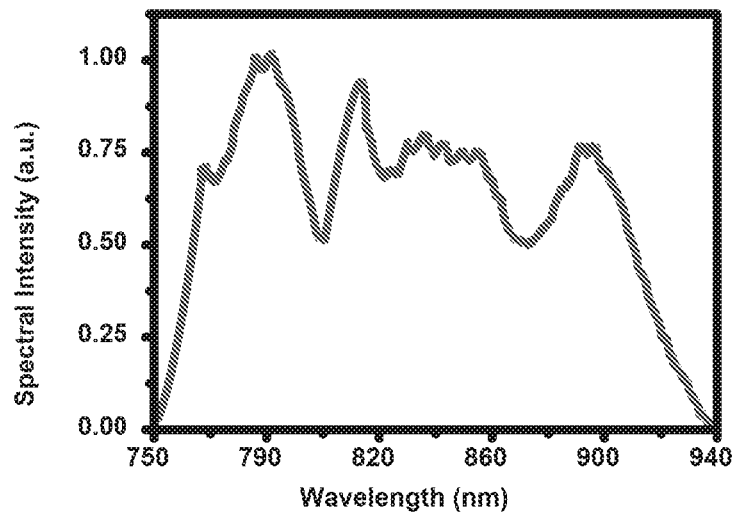

FIG. 9B is a plot of the normalized output spectrum of the light source 310. However, the choice of wavelength range is not limited to a particular regime and may be adjusted based on application requirements.

Figure 9C:
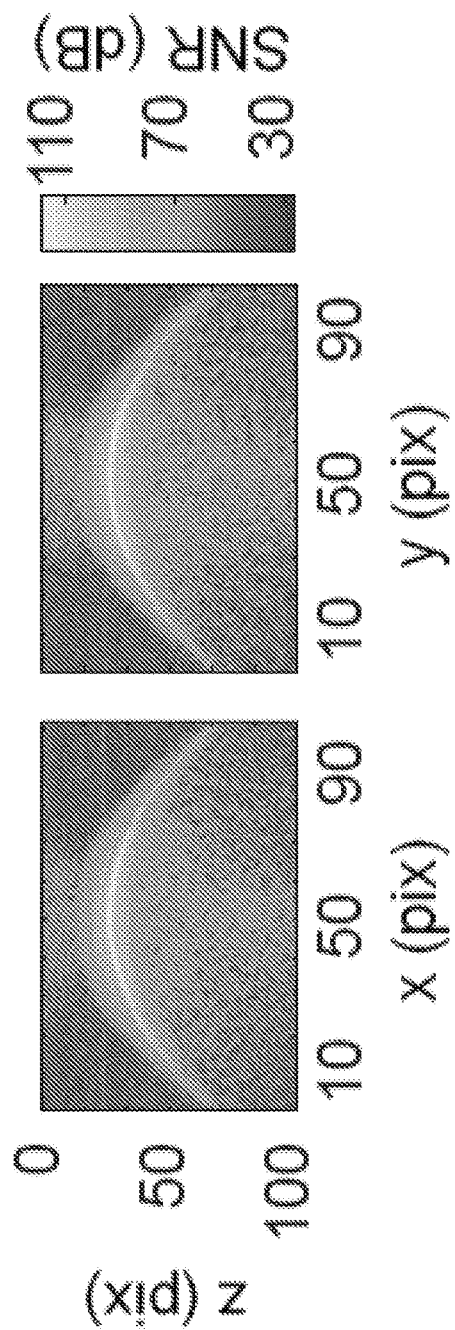
Figure 9D:
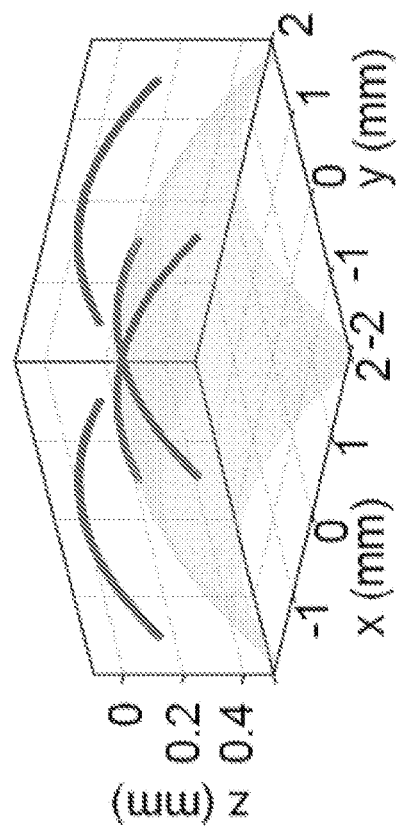
Figure 9E:
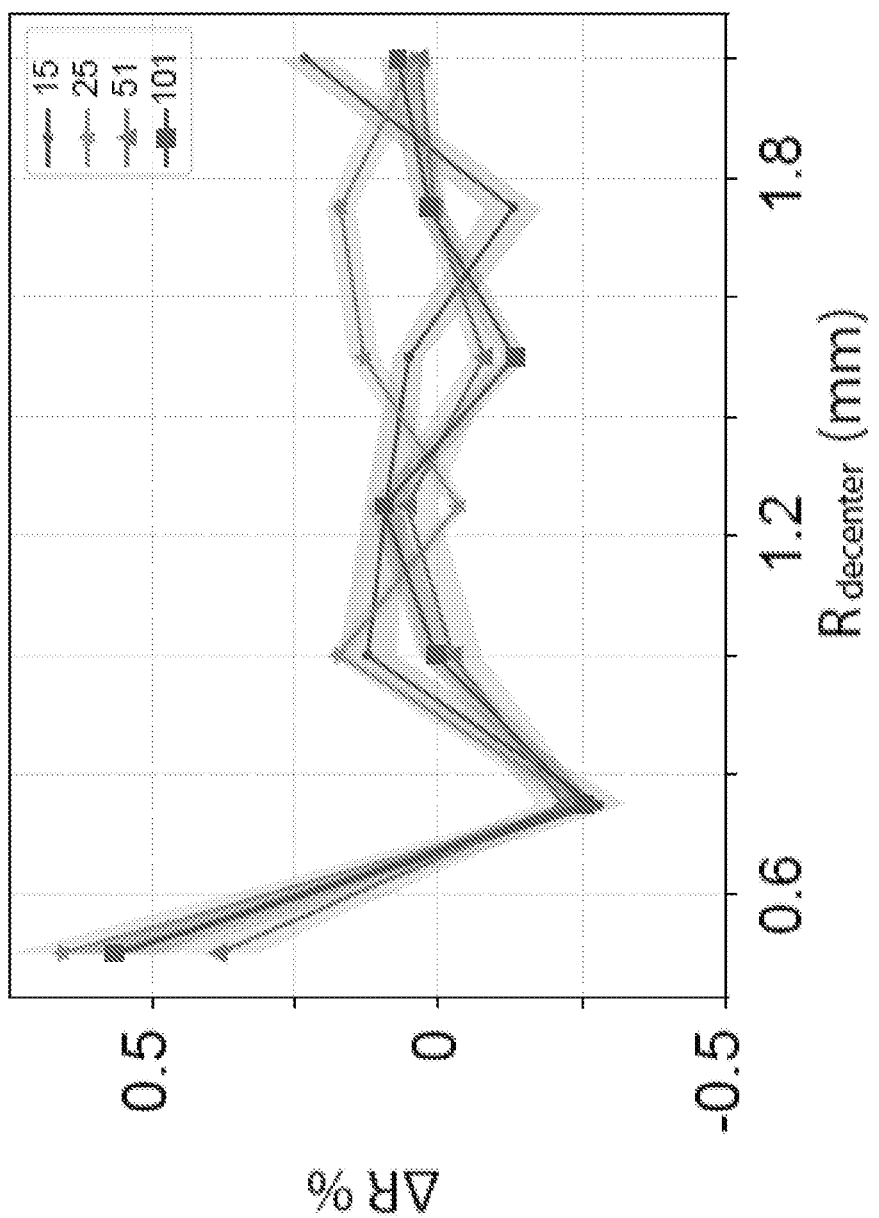

Referring to FIGS. 9C-9E, a ceramic reference sphere with 14.9851 mm diameter and 300 nm tolerance (e.g., RS-DK15-C, Carl Zeiss Industrial Metrology, LLC, USA) was imaged, segmented, and used to calibrate axial dimensions in LCI depth cross-sections. LCI external radius measurement accuracy was evaluated by imaging the reference sphere out to various decentered positions (Rdecenter) and with various sampling densities. The ceramic reference sphere surface was sampled out to ±1.5 mm (Rdecenter) showing loss of specular reflection signal with decenter. As shown in FIG. 9D, the segmented lens surface was converted from pixels to physical units and fit using a best-fit sphere. FIG. 9E shows percent deviation between measured and manufacturer specification for reference sphere radius at different sampling densities (number of samples per cross-section). Data points and shaded regions represent mean percent error and standard deviation, respectively (n=5). External radius measurement accuracies converge to ±0.2% of the manufacturer specification. As expected, measurement accuracy was dominated by Rdecenter and not sampling density because, in the ideal case, a spherical surface geometry can be fit with as few as three samples.

FIGS. 10A-10B illustrate surface sag plots from repeated acquisitions (n=5) of a lens surface profile using a fiber (FIG. 10A) and free-space (FIG. 10B) based Michelson interferometer (314, 316, 318, and 324). In the imaging system 300 design, the single-mode fiber core in the fiber-coupler acted as a pinhole to maintain confocal detection, and an uneven split was employed to maximize collection efficiency. The SNR was mainly limited by the available dynamic range of the CMOS sensor 326 of the spectrometer 322, but the exposure time was adjusted per acquisition to maximize SNR for each lens-under-test 316 surface. The reference arm 320 power was adjusted by a pupil to maximize fringe visibility. This design also allowed performance comparison between fiber-based and free space-based interferometers. While the accuracy was comparable, the measurement repeatability was significantly improved when using the free space interferometer. This is due to the stronger mechanical coupling between the reference and sample arms in the free-space design compared to the fiber-based one. Table 3 represents a comparison between measurement errors for the surface acquisitions in FIGS. 10A-10B (n=5).

TABLE 3

Surface Acquisition Measurement Errors

| INTERFEROMETER DESIGN | Mean Radius (mm) | Standard Deviation (mm (%)) | Range (mm (%)) |
|---|---|---|---|
| Fiber | 18.899 | 0.081 (0.43%) | 0.222 (1.17%) |
| Free-space | 18.893 | 0.005 (0.03%) | 0.012 (0.06%) |

The relationship between external radius measurement accuracy and decenter at which the measurements are taken is affected by two practical limitations. First, the surface reflectivity decreases with increasing decenter as a function of collection NA. A low signal results in surface segmentation errors and, thus, errors in sphere fitting. Second, external surface measurements are of purely specular reflections and there is an LCI path length ambiguity due to defocus and local surface slope resulting in a mismatch between the incident and reflected beam paths. Therefore, LCI measurements include an additive error term that underestimates the external radius of curvature and is proportional to both the measurement decenter position and NA. Contributions from both of these aforementioned sources of error were minimized by using an SNR threshold to remove surface measurements prior to sphere fitting which rejects measurements corresponding to local slopes exceeding approximately NA/2 (see FIGS. 11A-11C and 12A-12C). All measurements in this disclosure used an empirically determined SNR threshold of −27.5 dB relative to the maximum reflectivity at each measured surface.

Figure 13A:
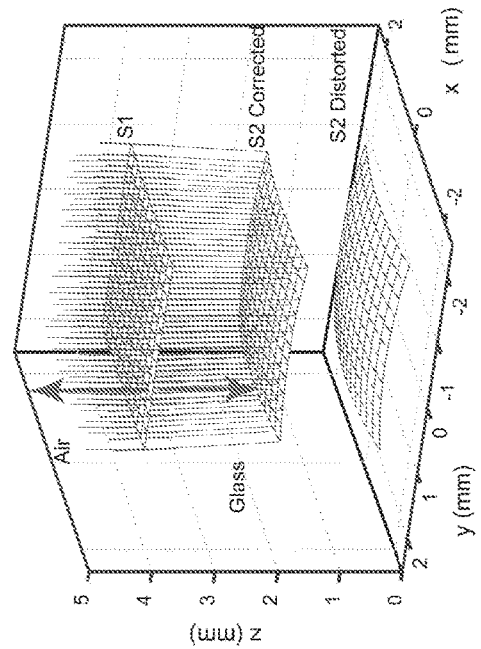
FIGS. 13A-13D graphically illustrate characterization of multi-element lenses, in accordance with some embodiments.
Figure 13D:
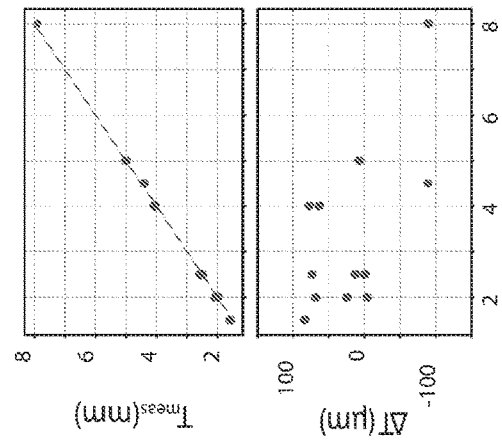
Figure 13B:
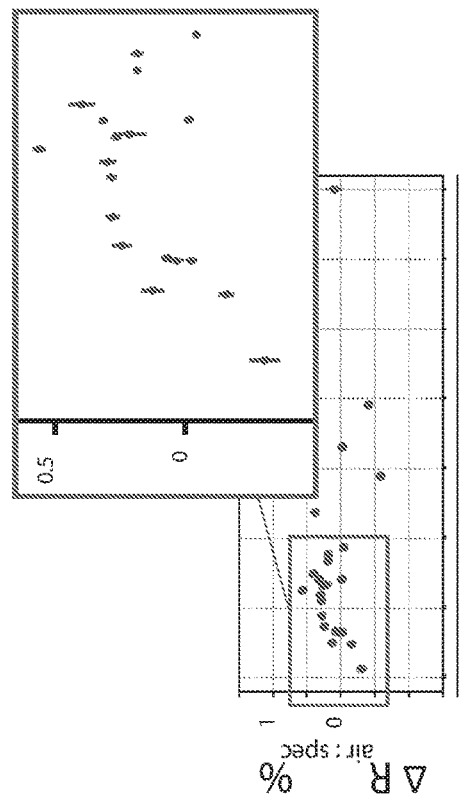

This external radius measurement method was validated on a total of 24 surfaces from 6 un-cemented achromatic doublets with varying curvatures (Table 4 and FIG. 13B). All measurements were within 1% of the manufacturer specification and tolerances.

FIGS. 11A-11C illustrate the effect of SNR thresholding on radius measurement accuracy. As shown in FIG. 11A, the error increases significantly at 2 mm decenter due to the large signal loss. FIG. 11B shows a magnified view of the percent error in the red box in FIG. 11A before, and in FIG. 11C, after SNR thresholding.

SNR thresholding was used for evaluating curved surfaces. As noted above, a −27.5 dB threshold was applied to the sampled surface points prior to sphere fitting to obtain the radius of curvature. FIGS. 11A-11C represent the measurement error from the reference sphere before and after SNR thresholding. It can be seen that thresholding enhances the measurement accuracy regardless of the sampling density.

The empirically determined SNR threshold limited the points used in the sphere fit for the reference sphere to within <1 mm decenter (see FIGS. 12A-12B). The surface normal of the reference sphere at 1 mm makes an angle that is approximately half the NA of the collection optics. Therefore, SNR thresholding essentially rejects points corresponding to surface tilts beyond NA/2. This is in agreement with previously published recommendations in confocal profilometry where allowable tilts were to be limited to NA/2 to minimize measurement errors. When imaging surfaces of unknown curvatures, SNR thresholding is advantageous as a simple method for limiting the collected angles.

FIGS. 12A-12C illustrate the deviation between measured and expected surface sag of the reference sphere. Referring to FIG. 12A, deviation at sampling decenter out to 1.8 mm shows a rapid increase in error beyond 1 mm. Referring to FIG. 12B, difference in sag due to manufacturing tolerance in the reference sphere diameter over the acquisition range is an order of magnitude less than the measurement errors shown in FIG. 12A. This indicates that the latter is the dominant source of error. As shown in FIG. 12C, the retained points after SNR thresholding lie within 1 mm decenter.

Internal radius and thickness measurements were performed. The high sensitivity of LCI enables detection of reflections from refractive index differences on the order of $10^{-5}$, making it uniquely suited for the evaluation of compound lens internal geometries. However, LCI measured internal curvatures are distorted by both refraction and pathlength scaling, which are functions of the phase and group refractive index of lens elements, respectively. In addition, aforementioned radius of curvature accuracy considerations for external radius measurements are directly applicable to all internal lens surfaces. In the present disclosure, corrections are made for distortions of internal lens geometries in post-processing by using optical properties of the respective lens glass material.

FIGS. 13A-13D graphically illustrate characterization of multi-element lenses. Referring to FIG. 13A, a computational ray-trace model was used to simulate the LCI illumination optical paths for all measurement locations over the lens-under-test 310 sampling area. The computational ray-trace model was used for correction of internal surface curvatures. Blue lines represent simulated chief rays for each LCI measurement and red lines show the corresponding surface normal at the measured external lens surface (S1). The lens surface S2-distorted denotes the internal surface segmented from LCI measurements. Chief rays incident on an initial surface (S1) were refracted and then propagated inside the glass material. The chief rays were refracted at S1 by the phase index and propagated by the lens thickness, which is calculated by scaling the measured optical distance between S1 and S2-Distorted by the group index. In other words, the physical propagation distance was calculated using the difference between the LCI measured optical pathlength between S1 and internal surface S2-Distorted. This difference was then scaled by the group index of the glass material evaluated at the LCI center wavelength. These simulated chief rays provided point-by-point three-dimensional coordinates for each distorted LCI measurement of the internal surface (S2-Distorted). The resulting three-dimensional propagated chief ray coordinates were used to remap S2-Distorted to a distortion-corrected internal surface S2 Corrected.

Propagation and refraction of chief rays through upstream lens elements results in an aspheric distortion-corrected internal surface. Experimentally, this aspheric distortion-corrected internal surface sag (Z) was fit using even powers of the radial distance from the optical axis (r) with the vertex radius (R) corresponding to the radius of curvature of the actual spherical surface.

$$Z = \sum_{n=1}^{8} a_n r^{2n} \tag{4}$$

$$R = \frac{1}{2a_1} \tag{5}$$

Internal radius measurements were validated on 12 surfaces from un-cemented achromatic doublets (Table 4). Six surfaces were each imaged through one upstream lens element (i.e., back surface of a singlet measured through the lens, simulating internal surface of a doublet) and six were imaged through two upstream lens elements (i.e., back surface of a doublet measured through both singlets, simulating internal surface of a triplet). Percent deviation of the internal radius of curvature relative to the corresponding curvature measured in air (i.e., as external surfaces) was calculated to evaluate internal radius measurement accuracy without bias from manufacturing tolerances (FIG. 13C).

FIG. 13B shows the percent deviation between radius of curvature measured externally and their respective manufacturer specification (Rair:spec). The inset shows a magnified view of the cluster of points between ±100 mm specification curvature.

Figure 13C:
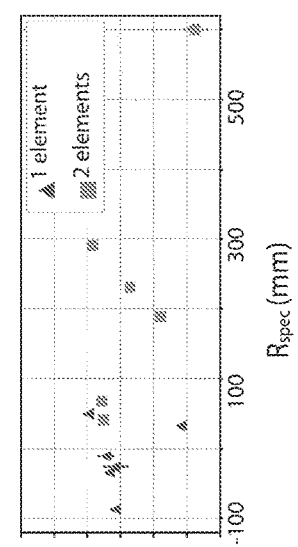

FIG. 13C shows percent deviation of internally measured radius of curvature, through either 1 or 2 glass elements, relative to the corresponding externally measured curvature (Rglass:air). Data points and error bars represent mean percent deviation and standard deviation, respectively (n=5).

Lens element thicknesses were measured along the optical axis. The physical thickness was calculated by scaling the measured optical pathlength between S1 and S2-Distorted by the group refractive index of the lens under test 320 materials (FIG. 13D, FIG. 13C).

FIG. 13D includes plots of measured thicknesses (Tmeas) and the corresponding errors relative to the manufacturer specification (Tspec). Manufacturer tolerances were ±1% for radius and ±200 μm for thickness.

A method is provided for identifying unknown glass materials by using a combination of RCM and LCI measurements and modeling. Characterization of internal lens geometries relies on prior knowledge of glass material properties (i.e., group and phase index).

Referring again to FIG. 9A, RCM measurements (rather than LCI measurements) were acquired in the lens characterization system 300 by blocking the reference reflector 320. The single-mode core of the fiber coupler acted as the confocal pinhole, which provided an RCM axial resolution of 16 μm at the center wavelength. The lens-under-test 316 was translated to measure the on-axis RCM axial response at the front and back surfaces of each optical element (FIG. 14A). The focal position at each surface was defined as the axial center-of-mass of the maximum 5% of RCM axial response intensities evaluated at the center wavelength. The axial difference between the focal positions of the two measured surfaces defines the confocal thickness (FIG. 14A, $z_c$), which was a function of both the glass material properties and lens geometry.

Figure 14E:
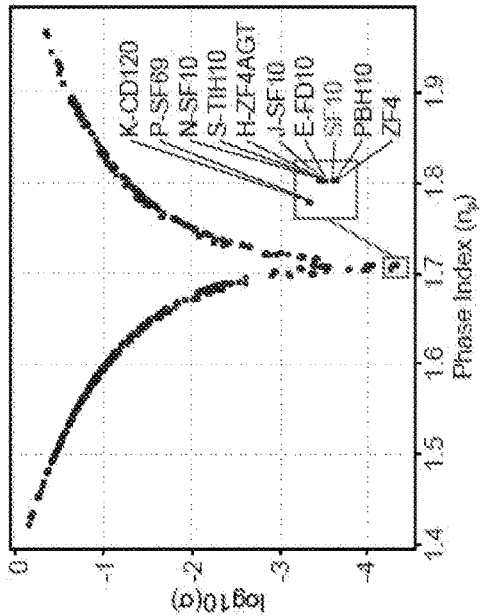

FIGS. 14A-14G graphically illustrate a method for glass material identification. FIG. 14A represents a geometric ray-trace model of RCM measurements. The solid blue line represents the incident illumination marginal ray, while the dotted blue line shows the un-refracted path, where the focus is initially at the upper surface of the lens element 410. The green line shows the refracted ray after the lower surface is brought into focus after the lens is translated axially by an offset ($z_c$), and the red line represents the surface normal at the point of incidence.

FIG. 14B illustrates a corresponding computational ray-trace simulating RCM illumination. FIG. 14C shows representative on-axis RCM axial response measured at three surfaces of an achromatic doublet (AC127-025-A, Thorlabs, Inc., USA).

Figure 14D:
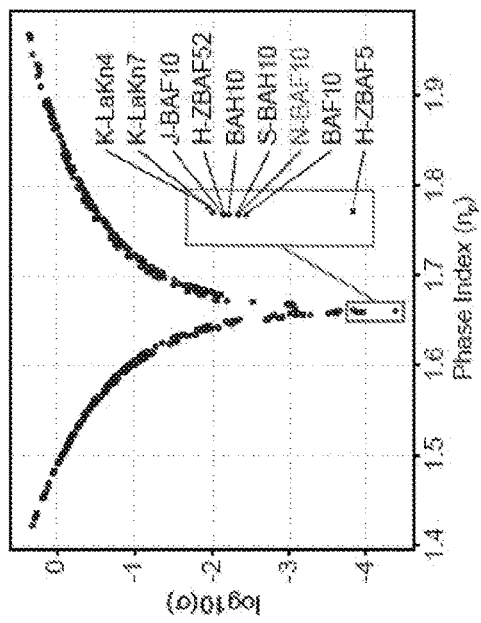

FIGS. 14D-14E show log-error plots corresponding to the glass elements in FIG. 14C. The insets show magnified cluster of glass materials near the minima. Red labels show manufacturer specified glass material for each lens element in FIG. 14A.

Figure 14F:
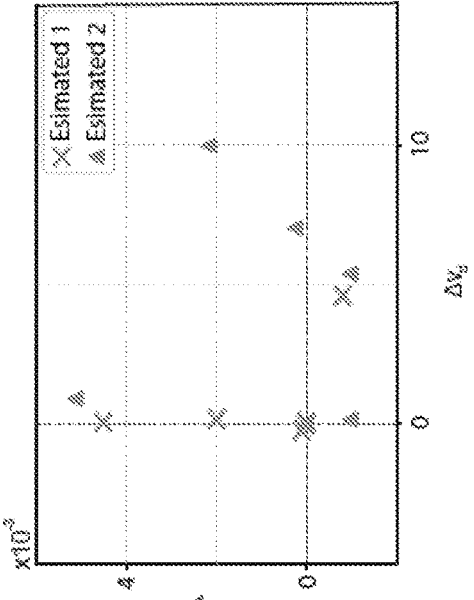

FIG. 14F includes phase index ($n_p$) and Abbe number ($v_d$) plot showing the relationship between identified and manufacturer specified glass material properties (dotted lines) for all 12 elements from Table 4.

Figure 14G:
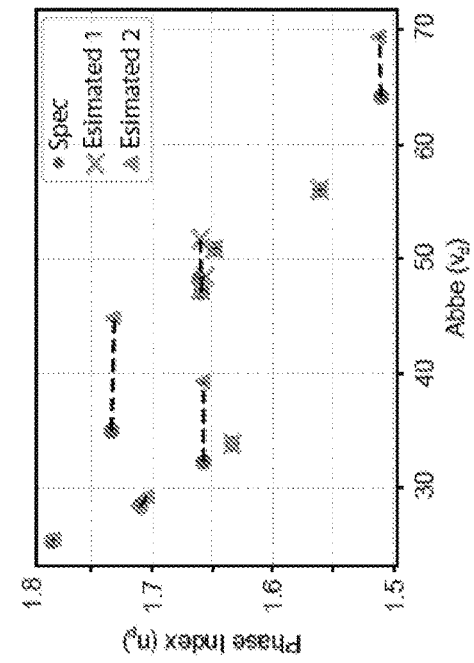

FIG. 14G shows deviations in $n_p$ and $v_d$ of identified glass materials relative to manufacturer specifications. Estimated 1 and 2 indicate materials that have been characterized through air, and through an upstream element, respectively. Glass material identification ambiguity was reduced by repeating LCI measurements of lens optical thickness along the optical axis at three wavelengths spanning the illumination spectrum ($\lambda_c$ =769, 830, 885 nm). This was achieved by adjusting the reference arm to center the zero-delay stationary phase point on each measurement wavelength. These optical thicknesses included inherent information about material dispersion properties at each measurement wavelength.

A database of the optical properties of all commercially available glass materials defined within the illumination bandwidth (1340 materials) was compiled. A computational ray-trace model of propagation through lens elements was then created (FIG. 14B) to exhaustively simulate RCM measurements (FIG. 15A) through each glass material. The axial focal positions of un-refracted (blue) and refracted (green) rays were computed using least-squares minimization of three-dimensional distances between the rays in the simulated illumination bundle. The unknown glass material was identified by minimizing the error function ($\sigma$) between simulated and measured parameters where, $$\sigma = (d - d_s)^2 + 2(\Delta t - \Delta t_s)^2, \quad (6)$$

$$\Delta t_s = d_s(n_g(\lambda_b) - n_g(\lambda_e)), \quad (7)$$

and $$d = \frac{t}{n_g(\lambda_o)} \quad (8)$$

Subscript s denotes a simulated parameter; d and t denote geometric and optical thickness respectively; and $n_g$ denotes group refractive index evaluated at $\lambda_b$, $\lambda_o$, and $\lambda_e$, which corresponds to wavelengths at the beginning, center, and end of the illumination bandwidth, respectively. FIGS. 14D and 14E show log($\sigma$) plots for each material in the database as a function of phase index at $\lambda_o$ for the two glass materials in Lens 1 (Table 4).

TABLE 4

Specified and Estimated Glass Materials and Thicknesses

| Lens | Glass | R1 | R2 | R3 | T | Phase Index ($n_p$) @ 830 nm | Abbe ($v_d$) | SPHA | CLA | BFL |
|---|---|---|---|---|---|---|---|---|---|---|
| 1 AC127-025-A | N-BAF10 | 18.8 | −10.6 | −68.1 | 5 | 1.6591 | 47.11 | 8.81 | −1.90 | 21.39 |
|  | SF10 |  |  |  | 2 | 1.7099 | 28.53 |  |  |  |
|  | H-ZBAF5 | 18.86 | −10.72 | −68.23 | 5.007 | 1.6601 | 47.28 | 9.33 | −1.78 | 21.35 |
|  | ZF4 |  |  |  | 1.996 | 1.7098 | 28.32 |  |  |  |
| 2 AC127-075-A | SF2 | −137.1 | −34.0 | 41.3 | 1.5 | 1.6336 | 33.82 | 0.14 | −0.62 | 73.10 |
|  | N-BK7 |  |  |  | 2.5 | 1.5102 | 64.17 |  |  |  |
|  | SF2 | −137.62 | −34.12 | 41.43 | 1.583 | 1.6336 | 33.82 | 0.16 | −0.41 | 72.97 |
|  | S-APL |  |  |  | 2.573 | 1.5112 | 69.56 |  |  |  |
| 3 ACN254-050-A | N-BAF10 | −34.0 | 32.5 | 189.2 | 2 | 1.6591 | 47.11 | −16.42 | 3.95 | −52.98 |
|  | N-SF6HT |  |  |  | 4.5 | 1.7826 | 25.36 |  |  |  |
|  | K-LaKn7 | −33.99 | 31.99 | 188.09 | 2.067 | 1.6599 | 51.72 | −16.09 | 2.59 | −52.88 |
|  | Q-SF6S |  |  |  | 4.411 | 1.7806 | 25.53 |  |  |  |
| 4 ACN254-100-A | N-BAK4 | −52.0 | 49.9 | 600.0 | 2 | 1.5608 | 55.97 | −1.16 | 1.76 | −103.88 |
|  | SF5 |  |  |  | 4 | 1.6574 | 32.25 |  |  |  |
|  | H-BAK7GT | −51.92 | 50.58 | 600.95 | 2.024 | 1.5608 | 56.06 | −1.42 | 3.06 | −103.45 |
|  | BAH32 |  |  |  | 4.063 | 1.6572 | 39.28 |  |  |  |
| 5 AC254-060-A | E-BAF11 | 41.7 | −25.9 | −230.7 | 8 | 1.6606 | 48.36 | 8.34 | −2.28 | 54.15 |
|  | FD10 |  |  |  | 2.5 | 1.7097 | 28.32 |  |  |  |
|  | H-ZBAF16 | 41.70 | −26.0 | −230.64 | 7.910 | 1.6561 | 48.43 | 10.25 | −2.69 | 53.56 |
|  | P-SF69 |  |  |  | 2.499 | 1.7046 | 29.23 |  |  |  |
| 6 AC254-200-A | N-SSK5 | 77.4 | −87.6 | 291.1 | 4 | 1.6484 | 50.88 | 0.29 | −0.54 | 194.31 |
|  | LAFN7 |  |  |  | 2.5 | 1.7335 | 34.95 |  |  |  |
|  | H-ZBAF50 | 77.54 | −87.47 | 289.93 | 4.0771 | 1.6484 | 50.87 | 0.31 | −1.93 | 193.99 |
|  | H-LAF3B |  |  |  | 2.513 | 1.7314 | 44.90 |  |  |  |

Table 4 includes a comparison between specification and estimated glass materials and thicknesses for all the characterized lens elements. Lenses were tested in ZEMAX with a collimated polychromatic beam spanning the laser source spectrum. The beam diameter was set to 95% of the full aperture, and the focus was found by minimizing the root-mean-squared spot size in the image plane. Measurements for R1 and R3 were obtained in air while R2 measurements were performed through 1 glass element and corrected. Manufacturer tolerances were +/−200 μm for thicknesses, 1% for radius, and +/−1% for focal length.

Glass material identification methods were also extended to multi-element lenses by performing RCM measurements and simulations serially through upstream elements. Identification accuracy was validated using 6 doublets (Table 4) by first identifying one optical element and then the second through the first. The phase index and Abbe numbers of the identified and manufacturer specified glass materials for all measured optical elements are plotted in FIG. 14F (dotted line denotes corresponding pairs of identified and specified material properties). Deviation of identified phase index and Abbe number relative to specification (FIG. 14G) indicates that this method is sometimes prone to overestimate the Abbe number, which is expected for spectroscopic measurements of optical properties using wavelengths in the near-infrared regime.

The robustness of disclosed method was evaluated by characterizing a commercial broadband multi-element scan lens (CSL-SL, Thorlabs Inc., USA). The scan lens was characterized in both forward and backward directions and combined to overcome working distance limitations of the current LCI/RCM system (19.5 mm). The optical performance of the empirically measured prescription data was compared against a black-box lens model provided by the manufacturer (FIG. 15A-15D).

An additional hammer optimization (OpticStudio, Zemax LLC, USA) for glass materials was performed on the empirically measured prescription data to minimize chromatic aberration arising from overestimation of Abbe number (FIG. 14G). A subset of candidate glass materials was selected for each measured optical element from materials within 1 log(σ) of the optimum, within ranges of Abbe number and phase index of ±10 and ±0.006, respectively. Measured prescription data was then optimized for achromatic performance over the manufacturer specified operating wavelength range (FIGS. 15A-15D, inset, and 16A-16F).

FIGS. 15A-15D graphically illustrate a ray-trace and spot diagram comparison of optical performance. FIGS. 15A-15B show manufacturer black-box lens model performance for 0, 7.5, and 10.5 degree object space field angles. FIGS. 15C-15D show corresponding performance for (e) empirically measured prescription data.

The image space NA and effective focal length of the empirically measured prescription data were 0.0291 and 68.74 mm, respectively, as compared to 0.0286 and 70 mm in the black-box model. Spot diagram and image space centroid positions were used to compare optical performance against the black-box model because aberration data was not publicly available (FIG. 15B and FIG. 15D).

FIGS. 16A-16F graphically illustrate a ray-trace and spot diagram comparison of optical performance. FIGS. 16A-16B show manufacturer black-box lens model performance for 0, 7.5, and 10.5 degree object space field angles. FIGS. 16C-D represent corresponding performance for empirically measured prescription data before optimization of glass materials. FIGS. 16E-16F represent corresponding performance for empirically measured prescription data after optimization of glass materials.

TABLE 5

Characterized lens prescription before glass material optimization

| SURFACE # | Radius | Thickness | Material | Phase index | Abbe Number |
|---|---|---|---|---|---|
| 1 | −24.558 | 7.099 | BAM23 | 1.5959 | 40.26 |
| 2 | −18.759 | 3.128 | L-LAH84P | 1.7971 | 40.29 |
| 3 | −28.697 | 0.240 | Air | | |
| 4 | 215.473 | 8.504 | K-PFK80 (M) | 1.4904 | 80.66 |
| 5 | −37.975 | 3.072 | S-YGH52 | 1.7743 | 50.00 |
| 6 | −44.534 | 0.560 | Air | | |
| 7 | 79.883 | 7.577 | K-PFK85 (M) | 1.4792 | 85.07 |
| 8 | −58.968 | 3.078 | D-LAF50 | 1.7620 | 49.60 |
| 9 | −127.415 | 0.540 | Air | | |
| 10 | 44.102 | 7.692 | K-PFK85 (M) | 1.4792 | 85.07 |
| 11 | −142.075 | 3.021 | MC-NBFD135 | 1.7935 | 40.92 |
| 12 | 46.196 | 60.575 | | | |

TABLE 6

Characterized lens prescription after glass material optimization

| SURFACE # | Radius | Thickness | Material | Phase index | Abbe Number |
|---|---|---|---|---|---|
| 1 | −24.558 | 7.099 | PBM3 | 1.6007 | 36.99 |
| 2 | −18.759 | 3.128 | LAH59 | 1.8026 | 46.63 |
| 3 | −28.697 | 0.240 | Air | | |
| 4 | 215.473 | 8.504 | J-FKH1 | 1.4930 | 82.57 |
| 5 | −37.975 | 3.072 | NBFD11 | 1.7722 | 43.93 |
| 6 | −44.534 | 0.560 | Air | | |
| 7 | 79.883 | 7.577 | K-PFK85 | 1.4811 | 85.19 |
| 8 | −58.968 | 3.078 | M-TAF401 | 1.7611 | 47.17 |
| 9 | −127.415 | 0.540 | Air | | |
| 10 | 44.102 | 7.692 | K-PFK85 (M) | 1.4792 | 85.07 |
| 11 | −142.075 | 3.021 | H-ZLAF1 | 1.7878 | 44.28 |
| 12 | 46.196 | 60.575 | | | |

TABLE 7

Glass candidates selected for each material in the lens prescription. Bolded names are the initially identified materials before optimization.

| SURFACE # | Glass material | Phase index | Abbe number |
|---|---|---|---|
| 1 | N-BAF4 | 1.59516 | 43.72 |
| | N-BAF4 | 1.59516 | 43.72 |
| | BAM23 | 1.59593 | 40.26 |
| | BAM5 | 1.59784 | 49.19 |
| | H-BAF6 | 1.59800 | 46.22 |
| | N-BAF52 | 1.59863 | 46.60 |
| | PBM3 | 1.60067 | 36.99 |
| 2 | LAM66 | 1.78407 | 34.97 |
| | L-LAH84 | 1.79335 | 40.55 |
| | P-LASF50 | 1.79350 | 40.46 |
| | P-LASF51 | 1.79503 | 40.92 |
| | L-LAH84P | 1.79710 | 40.29 |
| | S-LAH54 | 1.80147 | 44.36 |
| | LAH59 | 1.80258 | 46.63 |
| 4 | N-FK5 | 1.48176 | 70.40 |
| | FSL5 | 1.48178 | 70.21 |
| | K-PFK80(M) | 1.49042 | 80.66 |
| | Q-FK01S | 1.49163 | 81.67 |
| | N-PK52A | 1.49215 | 81.61 |
| | J-FKH1 | 1.49303 | 82.57 |
| 5 | NBFD11 | 1.77217 | 43.93 |
| | N-LAF33 | 1.77222 | 44.05 |
| | S-YGH52 | 1.77425 | 50.00 |
| | J-LASF014 | 1.77515 | 47.35 |
| | K-VC179(M) | 1.78006 | 41.85 |

TABLE 7-continued

Glass candidates selected for each material in the lens prescription. Bolded names are the initially identified materials before optimization.

| SURFACE # | Glass material | Phase index | Abbe number |
|---|---|---|---|
|  | N-LAF32 | 1.78115 | 45.53 |
| 7 | K-PFK85(M) | 1.47925 | 85.07 |
|  | K-PFK85 | 1.48111 | 85.19 |
|  | N-FK51A | 1.48195 | 84.47 |
| 8 | J-LASFH2 | 1.75416 | 46.78 |
|  | L-LAH87 | 1.75784 | 47.40 |
|  | N-LAF34 | 1.76038 | 49.62 |
|  | M-TAF401 | 1.76113 | 47.17 |
|  | D-LAF50 | 1.76198 | 49.60 |
| 10 | K-PFK85(M) | 1.47925 | 85.07 |
|  | K-PFK85 | 1.48111 | 85.19 |
|  | N-FK51A | 1.48195 | 84.47 |
| 11 | H-ZLAF1 | 1.78778 | 44.28 |
|  | J-LASFH6 | 1.78841 | 33.34 |
|  | J-LASF013 | 1.78907 | 39.61 |
|  | N-LASF44 | 1.79089 | 46.50 |
|  | NBFD13 | 1.79117 | 40.73 |
|  | K-VC181(M) | 1.79137 | 41.05 |
|  | MC-NBFD135 | 1.79345 | 40.92 |
|  | D-ZLAF52LA | 1.79502 | 41.00 |
|  | L-LAH84P | 1.79710 | 40.29 |

TABLE 8

Merit function used in Zemax to minimize lateral chromatic aberration in the visible wavelength range.

| # | Type | Int1 | Int2 | Hx | Hy | Px | Py | Target | Weight | Value | Contrib |
|---|---|---|---|---|---|---|---|---|---|---|---|
| 1 | CNPX | 18 | 1 | 0.500 | 0.500 | 0.000 | 5.000 | 0.000 | 0.000 | 6.282 | 0.000 |
| 2 | CNPX | 18 | 4 | 0.500 | 0.500 | 0.000 | 5.000 | 0.000 | 0.000 | 6.283 | 0.000 |
| 3 | CNPX | 18 | 2 | 0.500 | 0.500 | 0.000 | 5.000 | 0.000 | 0.000 | 6.281 | 0.000 |
| 4 | CNPX | 18 | 3 | 0.500 | 0.500 | 0.000 | 5.000 | 0.000 | 0.000 | 6.282 | 0.000 |
| 5 | CNPX | 18 | 5 | 0.500 | 0.500 | 0.000 | 5.000 | 0.000 | 0.000 | 6.284 | 0.000 |
| 6 | DIFF | 2 | 2 | 0.000 | 0.000 | 0.000 | 0.000 | 0.000 | 1.000 | 0.000 | 0.000 |
| 7 | DIFF | 2 | 3 | 0.000 | 0.000 | 0.000 | 0.000 | 0.000 | 1.000 | 0.002 | 50.761 |
| 8 | DIFF | 2 | 4 | 0.000 | 0.000 | 0.000 | 0.000 | 0.000 | 1.000 | 0.001 | 23.736 |
| 9 | DIFF | 2 | 5 | 0.000 | 0.000 | 0.000 | 0.000 | 0.000 | 1.000 | −0.001 | 19.039 |
| 10 | RSCE | 1 | 0 | 0.000 | 0.000 | 0.000 | 0.000 | 0.000 | 1.000 | 0.001 | 6.464 |

LCI profiles of internal surface were first acquired by sampling two orthogonal cross-sections similar to external surfaces, and the output image was fit to a sphere to obtain the distorted radius of curvature. Spherical surfaces representing the distorted internal surface and its upstream surfaces were then generated over an XY grid, separated axially by the measured geometric thicknesses. Finally, chief rays were propagated through all the surfaces over the entire grid based on the identified glass material properties, and the final surface image was corrected for distortions due to refraction and path-length scaling. However, since distortion-correction was only performed along the forward path, the final surface was aspheric. Direct sphere fitting was thus not suitable, and an aspheric fit was performed instead as explained above. The following Table 9 shows representative data from 4 doublet lenses comparing variability in the distortion-corrected radius obtained with spherical vs aspheric fitting, with the grid size varied from 0.2 to 0.8 of the respective lens diameters. It can be seen that the aspheric fit provides significantly more consistent values for the radius of curvature compared to the spherical fit.

An alternative approach would be to correct for the forward and reflected paths to obtain a more accurate representation of the spherical surface. However, since the surface curvature is unknown, the curvature must be iteratively optimized until the simulated distorted surface image matches the imaged surface.

TABLE 9

Comparison between spherical (S) and aspheric (A) fitting for measurement of radii of internal surfaces

| LENS MODEL | Radius (spec mm) | Fit type | Grid size / lens diameter | | | |
|---|---|---|---|---|---|---|
| | | | 0.2 | 0.4 | 0.6 | 0.8 |
| AC127-025-A | R2 (10.6) | S | 10.674 | 10.511 | 10.183 | 9.545 |
| | | A | 10.725 | 10.725 | 10.729 | 10.726 |
| | R3 (68.1) | S | 68.852 | 69.421 | 70.449 | 72.068 |
| | | A | 68.669 | 68.664 | 68.668 | 68.619 |
| AC254-200-A | R2 (87.6) | S | 87.435 | 87.325 | 87.136 | 86.860 |
| | | A | 87.472 | 87.472 | 87.471 | 87.471 |
| | R3 (291.1) | S | 292.298 | 292.195 | 292.023 | 291.783 |
| | | A | 292.332 | 292.333 | 292.332 | 292.333 |
| ACN254-050-A | R2 (32.5) | S | 31.830 | 31.303 | 30.252 | 28.088 |
| | | A | 31.992 | 31.991 | 31.984 | 32.011 |
| | R3 (189.2) | S | 185.027 | 187.011 | 190.543 | 196.050 |
| | | A | 184.386 | 184.394 | 184.421 | 184.127 |
| ACN254-100-A | R2 (49.9) | S | 50.520 | 50.334 | 50.005 | 49.495 |
| | | A | 50.580 | 50.579 | 50.579 | 50.576 |
| | R3 (600) | S | 589.157 | 594.478 | 603.679 | 617.300 |
| | | A | 587.419 | 587.421 | 587.418 | 587.431 |

LCI measurements of lens curvatures were performed using a free-space Michelson interferometer (314, 316, 318, and 324) to ensure mechanical stability between reference and sample arms and minimize sub-coherence length vibrations (FIGS. 10A-10B). This is similar to previously reported observations in confocal microscopy profilometry of highly reflective surfaces where the achievable accuracy was limited by sub-optical resolution surface features. Noise in the reported LCI measurements of surface curvatures was dominated by the accuracy of lens-under-test translation, which may be improved significantly with higher-precision actuators. One limitation of the curvature measurement method was that a spherical geometry was assumed for all external and internal curvatures, which precludes modeling of higher-order surfaces. LCI may be directly applied to tolerancing and characterization of aspheric, parabolic, and freeform surfaces, but would also require more robust data-fitting and ray-tracing methods.

The accuracy of optical element geometry measurements and glass material identification was dependent on LCI and RCM system specifications, namely NA, working distance, and illumination spectrum. These parameters may be directly tailored to specific applications and desired measurement accuracies. Non-contact lens characterization may enable real-time feedback on surface geometries, thicknesses, centration, tilt, and axial spacing of optical elements to benefit real-time inspection in manufacturing. Glass materials are known a priori in these commercial applications and, thus, a lower NA LCI/RCM with longer working distance may be used to evaluate full cross-sections of large lens assemblies. Alternatively, submicron axial resolution measurement of surface curvatures may be achieved by moving to ultrashort lasers sources. In research applications, such as biological microscopy, optical imaging systems routinely integrate commercial objectives. Full characterization of system aberrations requires precise measurements of both glass material properties and lens geometries. Empirically measured prescription data of multi-element commercial objectives enables design optimizations for optical resolution and throughput.

Previous efforts to measure material optical properties were limited to either assuming flat slab geometries, tracing the intersection between only chief and marginal rays, and, in some cases, assuming an approximate equality between group and phase refractive index. The disclosed computational ray-tracing approach addresses all of these limitations and provides several key advantages that make it well-suited for characterization of multi-element optical elements:

Computational simulation of an arbitrary number of rays more accurately simulates focal shift, inherently accounts for aberrations from both the system optics and lens-under-test surfaces, and may be easily extended to arbitrary surface geometries.

Reducing glass material identification to an error minimization problem within the finite set of commercially available glasses constrains the solution-space and eliminates the need for approximate numerical solutions.

Spectroscopic measurements of optical thickness provide an indirect measure of dispersion, which further constrains the set of possible solutions for lens geometries and glass materials.

Aberrations for all characterized doublet lenses at the center wavelength of the illumination source were within 2λ of the manufacturer specification (Table 4). Deviations in optical aberrations were primarily a result of errors in glass material identification. As previously mentioned, interrogation of optical elements using near-infrared light tended to overestimate Abbe numbers. This is likely because glass materials are less dispersive at these wavelengths as compared to the visible regime. Glass material identification accuracy may be improved by further constraining the glass material search-space to specific manufacturer catalogs based on prior information. For example, when characterizing Zeiss lenses, constraining glass materials to the Schott (Zeiss subsidiary) catalog would reduce the set of possible solutions by an order of magnitude. Here, only prior information about chromaticity in the visible wavelength range was leveraged to optimize the characterized model (FIGS. 16A-16F). Alternatively, RCM measurements for glass material identification may be performed within a wavelength range in which refractive index differences dominate the measurement noise. This may be achieved using a supercontinuum source and performing measurements and ray-tracing simulations at wavelengths in both the visible and the near-infrared ranges.

Systems and methods are provided for non-contact characterization of compound optical elements to enable modeling of optical aberrations and optimization of system performance. The disclosed combination of LCI and RCM measurements with computational ray-tracing was validated on commercial achromatic doublet lenses and a multi-element scan lens. The disclosed approach for glass identification overcomes fundamental limitations in previously described methods for measuring material optical properties and may be directly extended to arbitrary surface geometries. System performance is robust and may be customized to specific applications and achieve desired measurement accuracies by tailoring the illumination and collection NA and wavelength. This method is likely to broadly impact optical imaging in research, by enabling design optimization when integrating commercial lenses, as well as commercial optical manufacturing by providing non-contact, real-time feedback on tolerances and performance.

In the disclosed system and methods the LCI and RCM illumination used was a superluminescent diode (e.g., MT-850-HP, Superlum Diodes Ltd., Ireland) with 830 nm center wavelength and 140 nm full-width at half-maximum bandwidth. The lens-under-test 316 was mounted using a custom adaptor and translated using a two-axis x-y stage (e.g., MLS203-2, Thorlabs Inc., USA) and one-axis z-stage (e.g., MTS25-Z8, Thorlabs Inc., USA).

To perform RCM measurements, the reference arm 320 pupil was closed detecting signal only from the sample arm. To find the focus at a particular surface, the lens-under-test 316 was first manually translated for coarse positioning until the detected signal was near maximum. The z-axis stage was then stepped electronically through ±40 µm around the manually determined focus. The signal from the spectrometer 322 was then processed to plot the confocal axial response at the center wavelength. Finally, a weighted mean localization was performed to determine the position of the focal plane, as described in the previous section (FIG. 14A).

The lens 316 was mounted on a kinematic mount using a threaded retaining ring. LCI peaks from the retaining ring over x-y cross-sections spanning the lens-under-test 316 diameter were aligned by adjusting the kinematic mount to minimize lens tilt relative to the illumination beam. An initial LCI acquisition of the lens-under-test 316 surface cross-sections, followed by sphere-fitting, were performed to determine decentration. The initial acquisition positions were then updated to center the lens 316 relative to the illumination beam. The unknown surface was then brought into focus before performing any subsequent curvature measurements.

The reference arm 320 pupil and the detector 322 exposure time were adjusted to maximize signal and fringe visibility for each surface. The automated acquisition protocol included a background spectrum acquisition step followed by stepping the lens-under-test 316 through x-y cross-sections to sample the surface. The reported stage positions where stored during acquisition for subsequent electronic processing. The electronic processing code included background subtraction, followed by spectral-apodization using a Hanning window to minimize ringing artifacts. Numerical dispersion compensation was performed, followed by zero-padding and Fourier-transform to obtain the spatial-domain image. The transformed image was then segmented by taking the peak along each column. The segmented data were then transformed from pixel units to physical units before sphere-fitting to obtain the radius of curvature.

Figure 17:
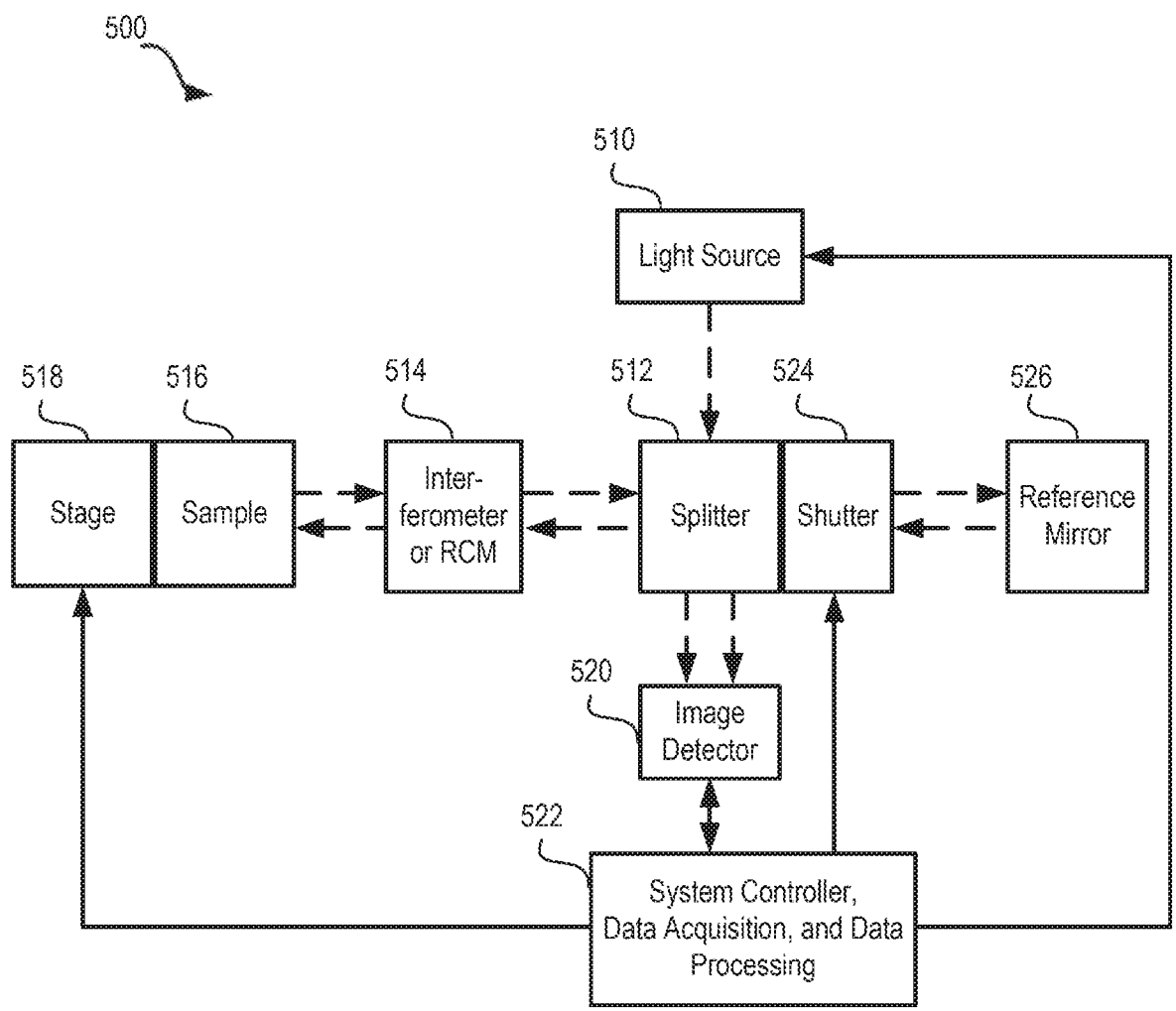
FIG. 17 illustrates a system for characterizing optical and geometric properties of materials and surfaces, in accordance with some embodiments.

FIG. 17 illustrates a system for characterizing optical and geometric properties of materials and surfaces. A system 500 includes a light source 510, a splitter 512, an interferometer or RCM 514, a sample-under-test 516, a stage 518, an image detector 520, a computer system 522, a shutter 524, and a reference mirror 526. The system 500 may be, for example, the system 100 shown in FIG. 1 or the lens characterization system 300 shown in FIG. 9A.

The system 500 may be utilized to characterize any suitable sample-under-test 516 that has refractive or optical properties. For example, various glasses or lenses may be characterized. The lenses may have one or more curved surfaces and may include spherical, aspheric, parabolic, or freeform surfaces, for example. Also, the sample-under-test 516 may be a compound lens where surfaces and materials of each of the lens elements may be characterized by the system 500. The characterizations may include various material, optical, and geometric properties, such as material identification, internal and external curvatures and/or thicknesses for one lens element or for multiple lens elements in a compound lens, quantified air gaps, tilts, and decenter, and dispersive metrics such as refractive index, group index, phase index, and Abbe number. The sample-under-test 516 may comprise other materials or substances. For example, the system 500 may characterize optical properties of a biological substance. In this regard, the sample-under-test 516 may be a cell or a cell nucleus where the refractive index, phase index, and/or group index are unknown and may change dynamically over time. These optical properties may be determined by using an appropriate light source 510 and image detector 520 for the dispersive properties of the biological substance.

The system 500 may be configured for taking measurements using interferometer or RCM modalities. When utilizing the system 500 for interferometer measurements (e.g., LCI, OCT, or other modalities) the shutter 524 may be open to receive and reflect light from the light source 510 to the image detector 520. In this configuration, the system 500 includes a reference arm including the reference mirror 526 and a sample arm including the sample-under-test 516 and interferometer 514. In some embodiments, the computer system 522 may be configured to control the shutter based on a program. In some embodiments, when the system is configured for RCM measurements, the image detector 520 may be configured to enhance the received signal, for example, by using an avalanche photo diode.

The system 500 may also be configured for RCM measurements by closing the shutter 524 or otherwise eliminating the sample arm comprising the reference mirror 526 from the system. In other words, light from the light source 510 travels to the sample 516 via the RCM and is reflected back to the image detector 520. The image detector 520 may be, for example, an electronic image sensor such as a CIS, a CCD, an APD, a BPD, and the like. In some embodiments, the image detector 520 may include a plurality of individual image detectors. For example, the image detector 520 may include an APD to perform RCM imaging, and may further include a CIS to perform OCT or LCI imaging.

The light source 510 illuminates the sample 510 for RCM and/or LCI measurements. The wavelength regime of the light source may be chosen based on dispersive properties of the sample-under-test 516. A regime that is subject to greater dispersive properties in the sample may provide enhanced results. For example, in the above described examples (FIG. 1A and FIG. 9A), where the sample-under-test was a glass lens, one regime is centered around 850 nm. In another example, such as for biological samples, where the refractive index may very over time, a more suitable regime relative to the dispersive properties of the sample would be white light or visible light. The regime chosen for the light source 510 may be based on which wavelengths can be used to appropriately measure the sample's dispersion properties. Furthermore, the light source may be a swept source such as the swept laser source 110 described with respect to FIG. 1, or the broadband laser source 310 described with respect to FIG. 9A. In general, the light source 510 may be, for example, a broadband light source such as a LED, OELD, SLD, high-pressure discharge lamp, and the like. The light source may be, in other examples, a plurality of individual light sources each emitting light in a comparatively-narrow band such that the plurality of individual light sources, operating together, may emit broadband light. With a broadband source, detection by a spectrometer (which may include the image detector 520) may discern for each color. The data collected for either type of sources is a function of reflection for each color band. In some embodiments, the computer system may be configured to control the light source 510. In one embodiment, the computer system 522 may control the power level and/or the illumination time dynamically, which may depend on decenter in a curved lens measurement or time varying refractive, phase, or group index in a biological sample-under-test.

Although the system 500 may be configured to for operation at various levels of automation, the computer system 522 may be configured to, among other things, control operations in the system 500, receive measurement data from the image detector 520, and processes the data for performing the methods and determining the results described herein.

The computer system 522 may include, among other things, an electronic processor, a memory, a display device, a graphical user interface, a network interface, user interfaces, that may be communicatively coupled via a communication bus.

The memory may store a program that when executed by the electronic processor may cause the electronic processor to perform evaluation of optical material properties and surfaces, according to the disclosure. For example, the electronic processor of the computer system 522 may be configured to control a reference arm pupil and detector 520 exposure time adjustments, illumination power adjustments, shutter 524 operations, and changing stage 518 axial (z) and x-y sampling positions. Furthermore, the electronic processor of the computer system 522 may receive data from the image detector 520 for measurements taken in the interferometer and RCM modalities. Moreover, the electronic processor of the computer system 522 may process data and/or model the system for performing the disclosed methods, such as, among other things, sphere fitting, focal tracking, signal processing, and computational ray-tracing.

In various embodiments, the electronic processor of the computer system 522 may be a uniprocessor system including one electronic processor, or a multiprocessor system including several electronic processors (e.g., two, four, eight, or another suitable number). Electronic processors may be any suitable processor capable of executing instructions. For example, in various embodiments, the electronic processors may implement any of a variety of instruction set architectures (ISAs), such as the x86, PowerPC, SPARC, or MIPS ISAs, or any other suitable ISA. In multiprocessor systems, each of the electronic processors may commonly, but not necessarily, implement the same ISA. While FIG. 17 illustrates a single computer system 522 as controlling the light source 510, the stage 518, the image detector 520, and the shutter 524, this is illustrative and not limiting. For example, the system 500 may include a plurality of independent or networked computer systems, each of which controls one or more of the light source 510, the stage 518, the image detector 520, or the shutter 524.

In some embodiments, at least one electronic processor of the computer system 522 may be a graphics processing unit. A graphics processing unit or GPU may be considered a dedicated graphics-rendering device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

The memory of the computer system 522 may be configured to store program instructions and/or data and accessible by the electronic processor. In various embodiments, the memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments, are stored within the memory as program instructions and data storage. In other embodiments, program instructions and/or data may be received, sent or stored upon different types of computer-accessible media or on similar media separate from the memory. Moreover, in some embodiments, a database that is accessible via the network interface may store, among other things, data for implementing desired functions, such as those disclosed above for various embodiments. Generally speaking, a computer-accessible medium may include storage media or memory media such as magnetic or optical media, e.g., disk or CD/DVD-ROM coupled to computer system via I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface.

In one embodiment, the communication bus of the computer system 522 is coupled between the electronic processor, memory, the graphical user interface, and peripheral devices including the network interface or other peripheral interfaces, such as the display interface, user interfaces, and element of the system 500 such as one or more of the image detector 520, the stage 518, the shutter 524, and the light source, for example. In some embodiments, the communication bus may perform any necessary protocol, timing or other data transformations to convert data signals from one component (e.g., the memory) into a format suitable for use by another component (e.g., the electronic processor). In some embodiments, the communication bus may include support for devices attached through various types of peripheral buses, such as a variant of the Peripheral Component Interconnect (PCI) bus standard or the Universal Serial Bus (USB) standard, for example. In some embodiments, the function of the communication bus may be split into two or more separate components, such as a north bridge and a south bridge, for example. In addition, in some embodiments some or all of the functionality of the communication bus, such as an interface to memory, may be incorporated directly into the processor.

The network interface may be configured to allow data to be exchanged between the computer system 522 and other devices attached to a network, such as other computer systems, a database, or imaging devices. In various embodiments, network interface may support communication via wired or wireless general data networks, for example: via telecommunications/telephony networks such as voice networks or digital fiber communications networks; via storage area networks such as Fiber Channel SANs, or via any other suitable type of network and/or communications protocol.

The user interfaces may support, in some embodiments, one or more of display terminals, keyboards, keypads, touchpads, scanning devices, voice or optical recognition devices, or any other devices suitable for entering or retrieving data by a user. Multiple user input/output devices may be present in the computer. In some embodiments, similar input/output devices may be separate from the computer and may interact with other devices through a wired or wireless connection, such as over network interface.

Those skilled in the art will also appreciate that, while various items may be stored in memory while being used, these items or portions of them may be transferred between memory and other storage devices for purposes of memory management and data integrity. Alternatively, in other embodiments some or all of the software components may execute in memory on another device and communicate with the illustrated system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer readable medium separate from the system may be transmitted to the system via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer readable medium. Accordingly, the present embodiments may be practiced with other computer system configurations.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, or flash memory, etc., as well as transmission media or signals such as electrical, electromagnetic, or digital signals, conveyed via a communication medium such as network and/or a wireless link.

FIGS. 18-21 include examples of methods for characterizing optical properties and surfaces. In some embodiments of the following examples, the computer 522 controls operations in the system 500 to perform and process interferometer or RCM measurements. For example, the computer system 500 may, among other things, control one or more of the translation of the stage 518, intensity of the light source 510, and exposure time of the image detector 520 to perform the methods described herein.

Figure 18:
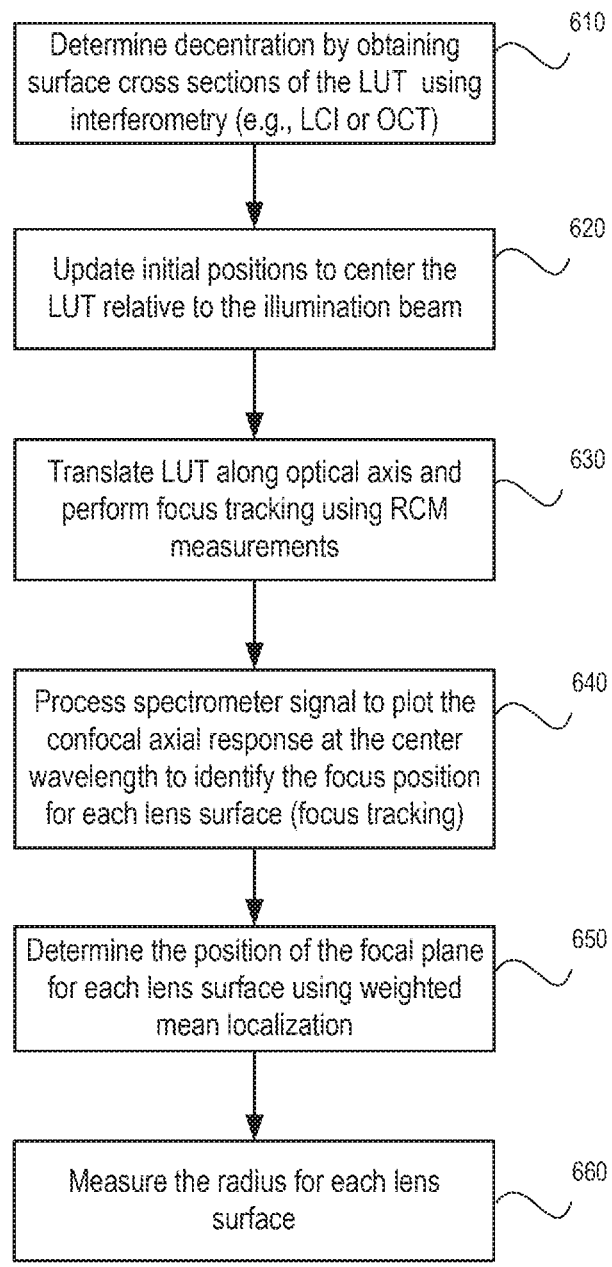
FIG. 18 is a flow chart for characterizing optical material properties and surfaces including locating focal planes of lens surfaces, in accordance with some embodiments.

FIG. 18 is a flow chart for characterizing optical material properties and surfaces including centering the sample-under-test 516 and locating focal planes of lens surfaces of the sample-under-test 516.

In step 610, the system 500 is configured for performing interferometry. Decentration is determined by the computer system 522 based on cross section measurements of the sample-under-test 516. The sample-under-test 516 may be, for example, a single lens element or a plurality of lens elements in a compound lens.

In step 620, the initial positions of the stage 518 are updated to center the sample-under-test 516 relative to the light source 510 illumination beam.

In step 630, the system 500 is configured for RCM measurements by closing the shutter 524, and the sample-under-test 516 is translated along the optical axis for taking focus tracking measurements of the surfaces of the sample-under-test, by the image detector 520. The surfaces may be internal and external surfaces and may be curved, for example, spherical, aspherical, parabolic, or freeform surfaces, for example.

In step 640, the computer system 522 receives the measurement data from the image detector 520 and processes the data to plot the confocal axial response at the center wavelength to identify the focus position for each lens surface.

In step 650, the computer system 522 determines the position of the focal plane for each lens surface using weighted mean localization.

In step 660 the radius for each lens may be measured using interferometry by controlling the stage 518 by the computer system 522 based on the focal plane positions of each lens surface.

Figure 19:
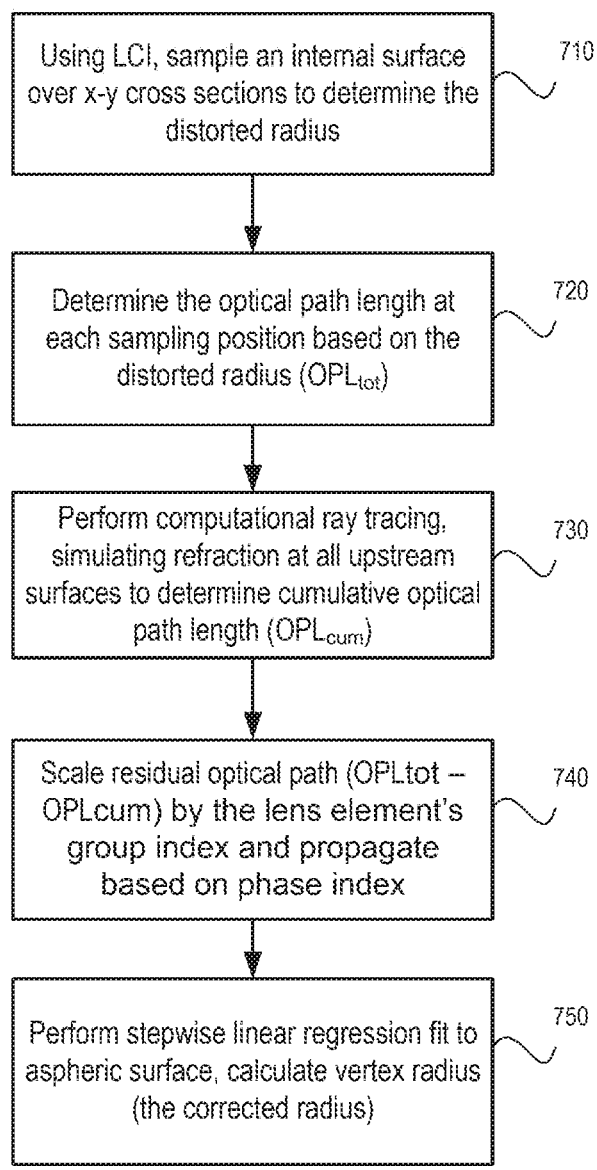
FIG. 19 is a flow chart for characterizing optical material properties and surfaces including measuring internal radii, in accordance with some embodiments.

FIG. 19 is a flow chart for characterizing optical material properties and surfaces including measuring internal radii of surfaces of the sample-under-test. The sample-under-test 516 may comprise a single lens element or a compound lens with multiple lens elements.

In step 710, the system 500 is configured for interferometry, and measurements are taken over x-y cross sections to determine the radius of curvature of an internal surface of the sample-under-test 516 (described above). These radius measurements are distorted by the optical properties of the sample-under-test 516.

In step 720, an optical path length at each sampling position on the internal surface is determined by the computer system 522 based on the distorted radius (OPLtot).

In step 730, the computer system 522 performs computational ray tracing to simulate refraction at all upstream surfaces and determines a cumulative optical path length (OPLcum).

In step 740, the computer system 522 scales a residual optical path length (OPLtot−OPLcum) by the lens element's group index and simulates ray propagation based on the phase index.

In step 750, the computer system 522 performs stepwise linear regression to aspherically fit the sample surface and determine a corrected vertex radius of the internal surface of the sample-under-test 516.

The above described steps of FIG. 19 may be repeated for each internal (or downstream) lens element surface in the sample-under-test 516 to arrive at a corrected vertex radius for each internal (or downstream) surface.

Figure 20:
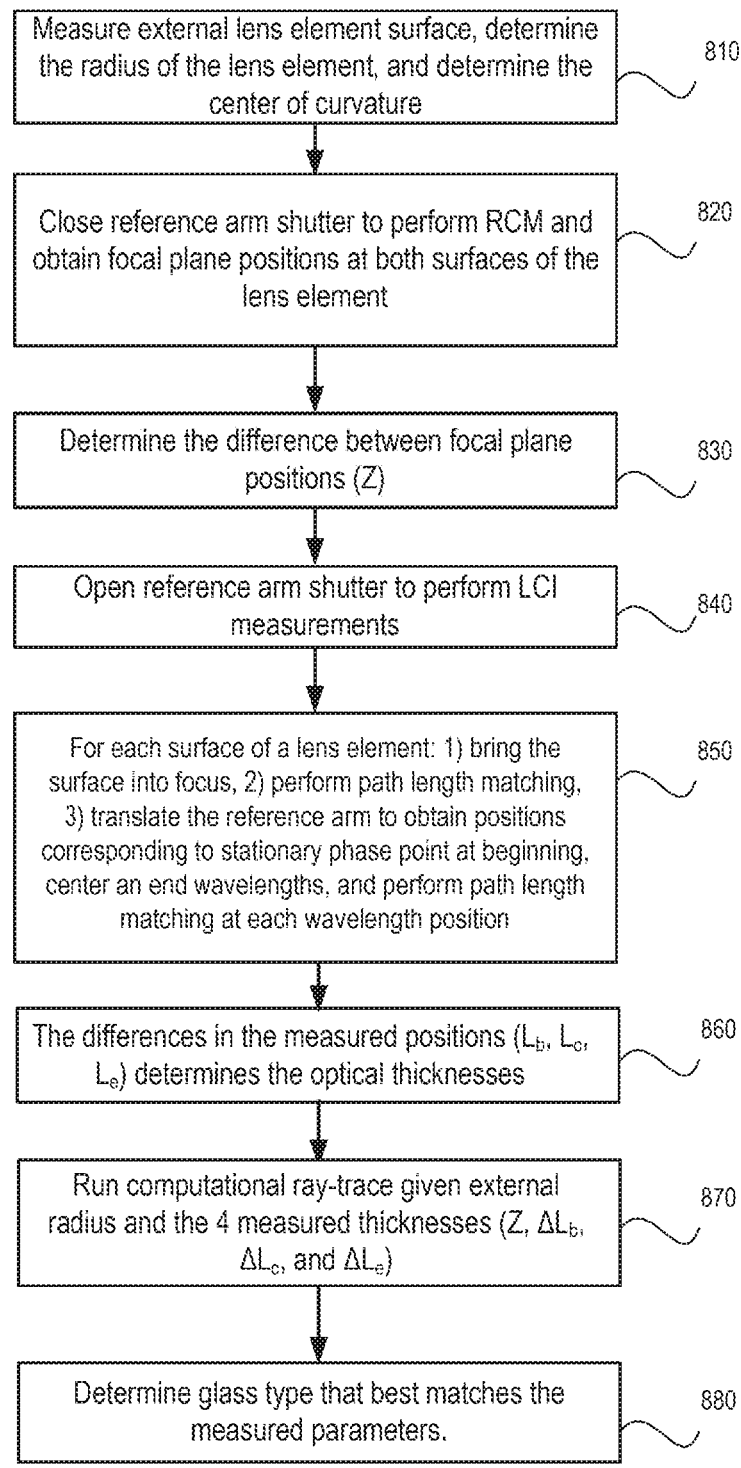
FIG. 20 is a flow chart for characterizing optical material properties and surfaces including determining a glass type for a lens element, in accordance with some embodiments.

FIG. 20 is a flow chart for characterizing optical material properties and surfaces including determining a glass type for a lens element.

In step 810, the system 500 is configured as an interferometer, for example, by opening the shutter 524. The external surface of a lens element of the sample-under-test 516 is measured by the interferometer 514 and detected by the image detector 520. The computer system 522 may receive the external surface measurements and determine the radius of curvature and the center of curvature.

In step 820, the system 500 is configured for RCM 514 measurements, for example, by closing the reference arm shutter 524. Focal plane positions at both surfaces of the lens element of the sample-under-test 516 are measured using RCM.

In step 830, the computer system 522 determines the difference between focal plane positions (Z) of the surfaces of the lens element.

In step 840, the system 500 is configured to perform interferometer 514 measurements, for example by opening the reference arm shutter 524.

In step 850, the following steps are performed for both surfaces (front and back) of the lens element. The lens element surface is brought into focus. A first position is determined by path length matching (described above) of the sample arm (with the sample 516) and the reference arm (with the reference mirror 526). The reference arm is translated to obtain positions corresponding to the stationary phase point at beginning, center, and end wavelengths (described above). For each of the three wavelength measurements, path length matching is performed to determine $L_b$, $L_c$, and $L_e$ at each lens surface.

In step 860, in the computer system 512 determines the optical path lengths (or optical thicknesses $\Delta L_b$, $\Delta L_E$, and $\Delta L_e$) for each of the three colors based on the differences in the measured positions. In other words, $L_b$, $L_c$, and $L_e$ are measured for the front and back surfaces of a lens element, and the differences between these measurements represents the optical thicknesses of the lens element at each color. For example, the optical thickness at the beginning of the spectrum would be $(L_{b\text{-front surface}} - L_{b\text{-back surface}})$.

At this point of the method, group index can be determined without matching the data to a library of glasses. In instances when an ultra-broadband light source is used in a regime of high material dispersion, many per wavelength measurements can be performed and an index curve can be determined as a function of color. For example, this may apply when the sample-under-test is a biological substance. In this case, a numerical solution for the group and phase index may be performed to find the optimal values.

In step 870, the computer system 522 performs computational ray-tracing based on the determined external radius, and the four measured optical thicknesses (Z, $\Delta L_b$, $\Delta L_c$, and $\Delta L_e$) to determine parameters for optical properties of the sample-under-test 516.

In step 880, the computer system 522 performs ray tracing on optical properties of commercially available glass materials, for example, glass materials defined within the illumination bandwidth. The unknown sample-under-test 516 is identified by minimizing an error function between simulated and measured parameters (described above). In other words, the confocal thickness and optical thicknesses of the sample are measured. For each glass material in the database, a simulation of the measurement process is performed which provides corresponding (simulated) values for confocal and optical thicknesses. The difference between these two sets of measurements is minimized to find the matching glass type.

Figure 21:
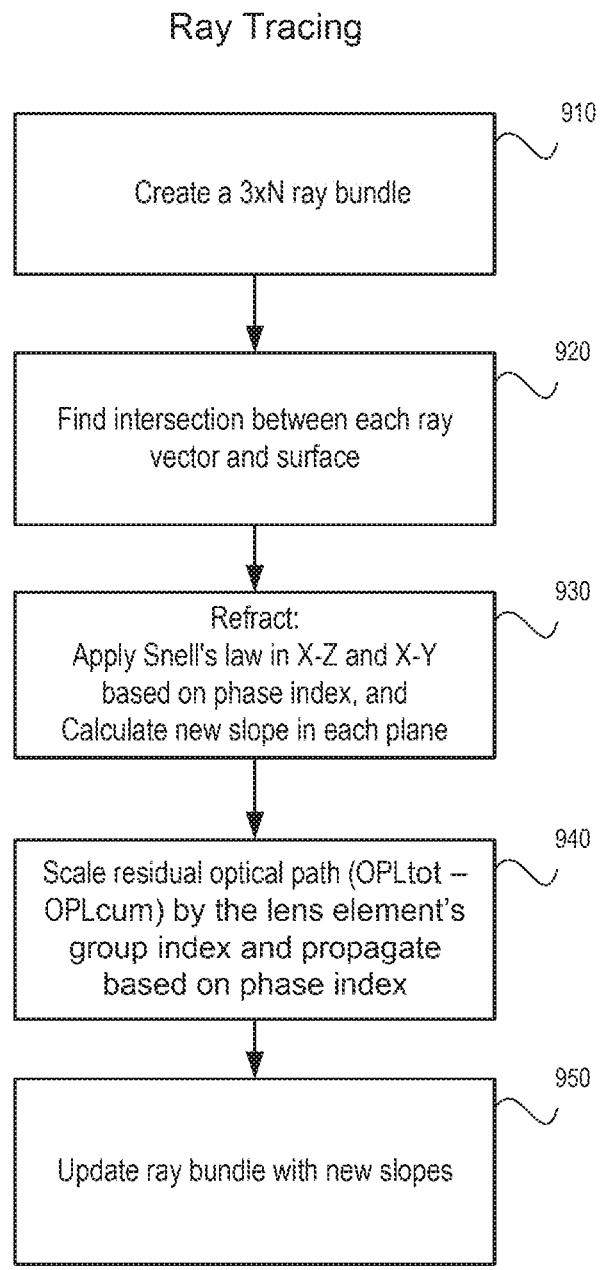
FIG. 21 is a flow chart for characterizing optical material properties and surfaces including using ray tracing, in accordance with some embodiments.

FIG. 21 is a flow chart for characterizing optical material properties and surfaces including using ray tracing. In step 910, the computer system 522 creates a 3×N ray bundle. In step 920, the computer system 522 determines the intersection between each ray vector and surface. In step 930, the computer system 522 performs refraction processing by applying Snell's law in X-Z and X-Y dimensions based on phase index, and calculates a new slope in each plane. In step 940, the computer system 522 scales the residual optical path (OPLtot−OPLcum) by the lens element's group index and propagates rays based on phase index. In step 950, the computer system 512 updates the ray bundle with new slopes. However, in some embodiments, 2D ray tracing is utilized. For example, when one cross-section is operated on, only 2D measurements and simulations may be performed.

Various features and advantages of the disclosure are set forth in the following claims.

The invention claimed is:

1. A method for characterizing an internal surface of a sample, the method comprising:
    measuring the internal surface over sections of the sample using interferometry;
    determining, by an electronic processor, a distorted radius of curvature of the internal surface based on the interferometry measurements;
    determining, by the electronic processor, an optical path length at each section based on the distorted radius of curvature;
    executing, by the electronic processor, computational ray tracing to simulate refraction at any upstream surface relative to the internal surface and determining a cumulative optical path length at each section based on the ray tracing;
    determining, by the electronic processor, a residual optical pathlength at each section based on the optical path length and the cumulative optical pathlength;
    scaling, by the electronic processor, the residual optical pathlengths by the sample's group index and propagating rays based on phase index; and
    executing, by the electronic processor, fitting of the sample surface and determining a corrected radius of curvature of the internal surface of the sample.

2. The method of claim 1, wherein step-wise linear regression is used to fit the sample surface aspherically.

3. The method of claim 1, wherein the sample is a single lens.

4. The method of claim 1, wherein the sample is a compound lens comprising a plurality of internal lens element surfaces and the method of claim 1 is repeated for each of the plurality of internal lens element surfaces of the compound lens to determine the corrected radius of curvature for each of the plurality of lens element surfaces of the compound lens.

5. The method of claim 1 further comprising:
    dynamically varying a level of power of a light source used for measuring the internal surface over the sections of the sample using interferometry based on an off-axis position of the light source relative to the internal surface.

6. The method of claim 1 further comprising:
    dynamically varying exposure time of an image detector used for measuring the internal surface over the sections of the sample using interferometry.

7. A system for characterizing optical properties and surfaces, the system comprising:
    a light source,
    an interferometer;
    an image detector;
    a sample-under-test; and
    an electronic processor coupled to a memory comprising instructions that when executed by the electronic processor configure the electronic processor to:
        determine a distorted radius of curvature of an internal surface of the sample under test based on interferometry measurements of the internal surface over sections of the internal surface;
        determine a distorted radius of curvature of the internal surface based on the interferometry measurements;
        determine an optical path length at each section based on the distorted radius of curvature;
        execute computational ray tracing to simulate refraction at any upstream surface relative to the internal surface and determine a cumulative optical path length at each section based on the ray tracing;
        determine a residual optical pathlength at each section based on the optical path length and the cumulative optical pathlength;
        scale the residual optical pathlengths by the sample's group index and propagate rays based on phase index; and
        execute, by the electronic processor, fitting of the sample surface and determine a corrected radius of curvature of the internal surface of the sample.

8. The system of claim 7 further comprising a stage for supporting the sample-under-test, the stage translatable in x-y and axial directions for translating the sample-under-test for performing the interferometry measurements of the internal surface over x-y cross sections of the internal surface.

9. The system of claim 7, wherein the sample-under-test is a single lens or a compound lens comprising a plurality of internal lens element surfaces and the determining of the corrected radius of curvature is repeated for each of the plurality of internal lens element surfaces of the compound lens.

10. The system of claim 7 further comprising:
    a reflectance confocal microscope (RCM);
    a reference arm;
    a sample arm comprising the sample-under-test;
    wherein the electronic processor is further configured to:
        determine an optical thickness of the sample-under-test based on the difference between focal plane positions of each surface of the sample-under-test wherein the focal planes are measured using the RCM;
        determine an optical path length for each of three wavelengths based on per-color path length matching of the reference arm and the sample arm in the interferometer for the each of the three wavelengths, wherein the pathlength matching is based on measurements for each surface of sample-under-test including:
            translating the sample-under-test surface to the focal plane position of the sample-under-test surface;
            performing, by the electronic processor, path length matching of the reference arm and the sample arm in the interferometer; and
            translating the reference arm of the interferometer to positions corresponding to stationary phase points for the three wavelengths to perform the per-color pathlength matching; and
        execute computational ray tracing based on the radius of the lens element, the optical thickness based on the difference of focal plane positions, and the optical path lengths for each of the three wavelengths to determine parameters of properties of the sample-under-test.

11. The system of claim 10, further comprising a shutter that blocks an illumination path from the light source into the reference arm of the system when performing RCM measurements and opens the reference arm to illumination from the light source for detection of the illumination from the light source via the reference arm by the image detector for performing interferometry measurements.

12. The system of claim 10, wherein the sample-under-test is a lens element in a compound lens comprising one or more other lens elements, and the same parameters for properties of the sample-under-test are determined for each of the other one or more lens elements by performing the RCM and interferometry measurements and executing the ray tracing for each of the other one or more lens elements.

13. The system of claim 10, wherein the sample-under-test is a lens element and the electronic processor is further configured to identify a glass type for the lens element by minimizing an error function based on the parameters determined for properties of the sample-under-test and parameters determined of optical properties of a plurality of known glass types in a glass data base.

\* \* \* \* \*